(12) United States Patent
Lin

(10) Patent No.: US 10,883,750 B2
(45) Date of Patent: Jan. 5, 2021

(54) AIR CONDITIONING SYSTEMS AND METHODS WITH COOLING CAPACITY MODULATION VIA FIXED PUMP OPERATION AND VARIABLE CONDENSER FAN OPERATION

(71) Applicant: Vertiv Corporation, Columbus, OH (US)

(72) Inventor: Zhiyong Lin, Dublin, OH (US)

(73) Assignee: Vertiv Corporation, Columbus, OH (US)

( * ) Notice: Subject to any disclaimer, the term of this patent is extended or adjusted under 35 U.S.C. 154(b) by 170 days.

(21) Appl. No.: 16/186,648

(22) Filed: Nov. 12, 2018

(65) Prior Publication Data

US 2019/0178548 A1    Jun. 13, 2019

Related U.S. Application Data

(60) Provisional application No. 62/596,955, filed on Dec. 11, 2017.

(51) Int. Cl.
*F25B 49/02* (2006.01)
*F25B 41/04* (2006.01)
*F25B 1/00* (2006.01)

(52) U.S. Cl.
CPC .............. *F25B 49/027* (2013.01); *F25B 1/00* (2013.01); *F25B 41/043* (2013.01); *F25B 49/02* (2013.01); *F25B 49/022* (2013.01); *F25B 2400/0401* (2013.01); *F25B 2400/06* (2013.01); *F25B 2600/0251* (2013.01); *F25B 2600/0253* (2013.01); *F25B 2600/111* (2013.01); *F25B 2600/13* (2013.01); *F25B 2700/172* (2013.01)

(58) Field of Classification Search
CPC ............ F25B 49/027; F25B 2400/0401; F25B 2600/111; F25B 2600/13
See application file for complete search history.

(56) References Cited

U.S. PATENT DOCUMENTS

2013/0098086 A1* 4/2013 Sillato ..................... F25B 49/02
62/184
2016/0061494 A1* 3/2016 Vasvari ................... F25B 13/00
62/324.1

FOREIGN PATENT DOCUMENTS

EP         2767784 A2    8/2014
WO   WO-2014/055914 A1    4/2014

* cited by examiner

*Primary Examiner* — Jonathan Bradford
(74) *Attorney, Agent, or Firm* — Harness, Dickey & Pierce, P.L.C.

(57) ABSTRACT

A cooling system is provided and includes pump, condenser fan, and control modules. The pump module controls a pump to pump a cooling fluid through a cooling circuit. The condenser fan module controls a condenser fan to transfer air across a condenser of the cooling circuit. The control module, while operating in a pumped refrigerant economizer mode or a mixed mode, determines a requested CFC percentage. The pump module activates the pump if the requested CFC percentage is greater than or equal to a predetermined CFC percentage. The condenser fan module: if the requested CFC percentage is greater than or equal to the predetermined CFC percentage, activates the condenser fan or operates the condenser fan at least at a minimum speed; and based on the requested CFC percentage, adjusts a speed of the condenser fan between the minimum speed and a maximum permitted speed to provide the requested CFC percentage.

40 Claims, 15 Drawing Sheets

AIR CONDITIONING SYSTEMS AND METHODS WITH COOLING CAPACITY MODULATION VIA FIXED PUMP OPERATION AND VARIABLE CONDENSER FAN OPERATION

CROSS-REFERENCE TO RELATED APPLICATIONS

This application claims the benefit of U.S. Provisional Application No. 62/596,955, filed on Dec. 11, 2017. The entire disclosures of the applications referenced above are incorporated herein by reference.

FIELD

The present disclosure relates to cooling capacity control systems.

BACKGROUND

This section provides background information related to the present disclosure which is not necessarily prior art.

Cooling systems have applicability in a number of different applications where a fluid is to be cooled. The fluid may be a gas, such as air, or a liquid, such as water. Example applications are heating, ventilation, air conditioning (HVAC) systems that are used for cooling spaces where people are present such as offices and data center climate control systems. A data center may refer to a room having a collection of electronic equipment, such as computer servers.

In FIG. 1, an air conditioner 50 that may be used in, for example, a computer room is shown. The air conditioner 50 includes a cooling circuit 51 and a cabinet 52. The cooling circuit 51 is disposed in the cabinet 52 and includes an evaporator 54, an air moving device 56, a compressor 58, a condenser 60, and an expansion valve 62. The evaporator 54, compressor 58, condenser 60 and expansion valve 62 are connected in a closed loop in which a cooling fluid (e.g., phase change refrigerant) circulates. The evaporator 54 receives the cooling fluid and cools air passing through openings in evaporator 54. The air moving device 56 (e.g., a fan or squirrel cage blower) draws the air from an inlet (not shown) in the cabinet 52 and through the evaporator 54. The cooled air is directed from the evaporator 54 and out a plenum 64 in the cabinet 52.

The compressor 58 circulates the cooling fluid through the condenser 60, the expansion valve 62, the evaporator 54 and back to the compressor 58. The compressor 58 may be, for example, a scroll compressor. A scroll compressor may be a fixed speed, digital, or variable speed compressor. A scroll compressor typically includes two offset spiral disks. The first spiral disk is a stationary disk or scroll. The second spiral disk is an orbiting scroll. The cooling fluid is received at an inlet of the scroll compressor, trapped between the offset spiral disks, compressed, and discharged at a center (or outlet) towards the condenser 60. The condenser 60 may be a micro-channel condenser that cools the cooling fluid received from the compressor 58. The expansion valve 62 may be an electronic expansion valve and expand the cooling fluid out of the condenser 60 from, for example, a liquid to a vapor.

A position of the expansion valve 62 (or opening percentage of the expansion valve) may be adjusted to control a suction superheat value of the compressor 58. The suction superheat value of the compressor is equal to a compressor suction temperature minus a compressor saturated suction temperature. A compressor suction pressure may be used to determine the compressor saturated suction temperature. The compressor suction temperature and the compressor suction pressure may be determined based on signals from corresponding sensors connected between the evaporator 54 and the compressor 58. The superheat value refers to an amount that a temperature of a cooling fluid, in a gas state, is heated above the compressor saturated suction temperature. The superheat value can be used to modulate (or adjust) position of the expansion valve 62. Position (or opening percentage) control of the expansion valve 62 may be performed by a proportional, integral, derivative (PID) control module. The PID control module controls the superheat value to match a constant predetermined superheat setpoint. This ensures compressor reliability and improves compressor efficiency.

SUMMARY

This section provides a general summary of the disclosure, and is not a comprehensive disclosure of its full scope or all of its features.

In an aspect, a cooling system is provided and includes a first pump module, a first condenser fan module, and a control module. The first pump module is configured to control a first pump to pump a first cooling fluid through a first cooling circuit. The first condenser fan module is configured to control a first condenser fan to transfer air across a first condenser of the first cooling circuit. The control module is configured to, while operating in a pumped refrigerant economizer mode or a mixed mode, determine a requested call for cooling percentage. The first pump module is configured to activate the first pump if the requested call for cooling percentage is greater than or equal to a first predetermined call for cooling percentage. The first condenser fan module is configured to (i) if the requested call for cooling percentage is greater than or equal to the first predetermined call for cooling percentage, at least one of activate the first condenser fan or operate the first condenser fan at least at a first minimum speed, and (ii) based on the requested call for cooling percentage, adjust a speed of the first condenser fan between the first minimum speed and a first maximum permitted speed to provide the requested call for cooling percentage.

In another aspect, a method of controlling a cooling system is provided. The method includes: controlling a first pump to pump a first cooling fluid through a first cooling circuit; controlling a first condenser fan to transfer air across a first condenser of the first cooling circuit; while operating in a pumped refrigerant economizer mode or a mixed mode, determining a requested call for cooling percentage; and activating the first pump if the requested call for cooling percentage is greater than or equal to a first predetermined call for cooling percentage. The method further includes: if the requested call for cooling percentage is greater than or equal to the first predetermined call for cooling percentage, at least one of activating the first condenser fan or operating the first condenser fan at least at a first minimum speed; and based on the requested call for cooling percentage, adjusting a speed of the first condenser fan between the first minimum speed and a first maximum permitted speed to provide the requested call for cooling percentage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected implementations and not all possible implementations, and are not intended to limit the scope of the present disclosure.

Figure 14:
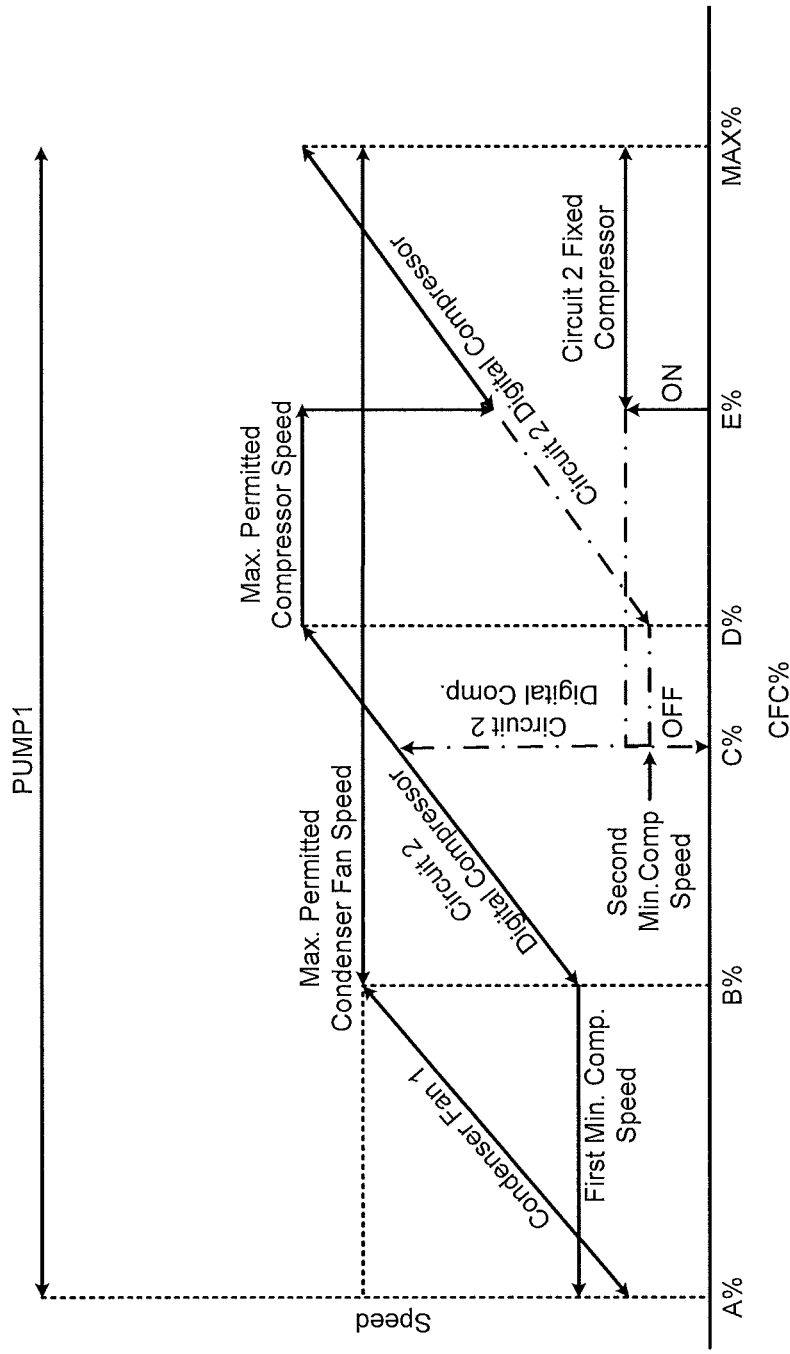
Figure 15:
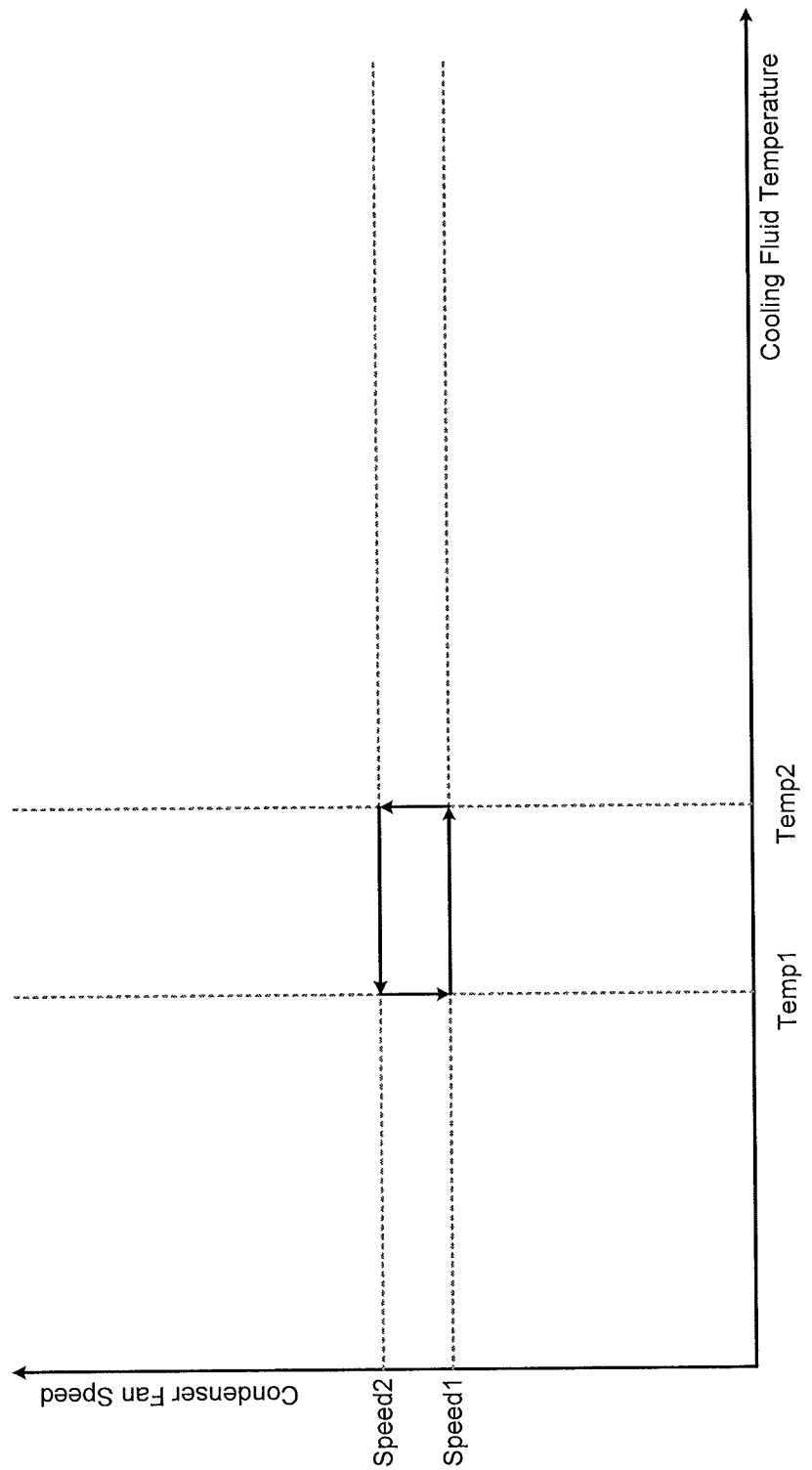

FIG. 14 is an example of a plot illustrating speeds of a pump, a condenser fan, and compressors relative to a call for cooling percentage for a dual stage cooling system operating in a mixed mode and having tandem compressors per stage in accordance with an aspect of the present disclosure; and FIG. 15 is an example condenser fan speed versus cooling fluid temperature plot illustrating determination of maximum permitted condenser fan speeds in accordance with an aspect of the present disclosure.

Corresponding reference numerals indicate corresponding parts throughout the several views of the drawings.

DETAILED DESCRIPTION

Example implementations will now be described more fully with reference to the accompanying drawings.

An air conditioning (or cooling) system may include a condenser (or outdoor coil), an expansion valve, an evaporator (or indoor coil), and a compressor. The cooling system may operate in a direct expansion (DX) mode, a pump refrigerant economizer (PRE) mode and/or a mixed mode. The DX mode refers to when one or more compressors of a cooling circuit (or first cooling stage) is ON and operating at a speed of greater than 0. The PRE mode refers to when (i) one or more compressors of a cooling circuit are OFF and/or speeds of the one or more compressors is 0, and (ii) a pump of the cooling circuit is ON and operating at a speed of greater than 0. A mixed mode refers to a multi-stage cooling system having two or more cooling circuits, where a first cooling circuit is operating in the PRE mode and the second cooling circuit is operating in the DX mode. These modes are further described below with respect to the disclosed examples.

Cooling capacity of a cooling circuit is limited while operating in the PRE mode. The cooling capacity is restricted by an outdoor ambient temperature and/or a heat rejection capability of an outdoor unit including a condenser. While operating in the PRE mode, changing a speed of a pump of the cooling circuit has limited or no effect on cooling capacity of the cooling circuit. In addition, the corresponding cooling system can be instable when the speed of the pump is less than a predetermined speed due to the cooling system no longer maintaining a net positive suction pressure into compressors. As a result, the cooling system is sensitive to small changes in temperature and air flow. To prevent this, the cooling system maintains the speed of the pump above a minimum pump speed.

While operating in the PRE mode, a speed of a condenser fan may be adjusted to adjust a temperature of a cooling fluid circulating through the cooling circuit when the temperature is less than a predetermined temperature (e.g., 37° F.). A condenser fan traditionally however does not operate efficiently while in the PRE mode due to system control of a speed of the condenser fan to provide a fixed cooling fluid temperature. Energy can also be wasted when the outdoor ambient temperature is greater than the predetermined temperature. When this occurs, the cooling system operates a condenser fan at a full ON speed (or 100%). Another disadvantage with traditional cooling systems is that when the pump is operating at a low speed and the outdoor ambient temperature is less than a predetermined temperature, there is a possibility that corresponding liquid lines can freeze.

Examples set forth herein provide single and multi-stage cooling systems and methods for adjusting cooling capacity of cooling circuits by adjusting speeds of one or more condenser fans. This includes operating one or more pumps. The pumps may be operated at full or maximum permitted operating speeds. Energy consumption of a pump at full speed is small relative to energy consumption of an indoor blower (or evaporator fan) and outdoor condenser fan. Thus, maintaining one or more pumps at full speed has minimal impact on operating efficiency of the corresponding cooling circuits.

Figure 1:
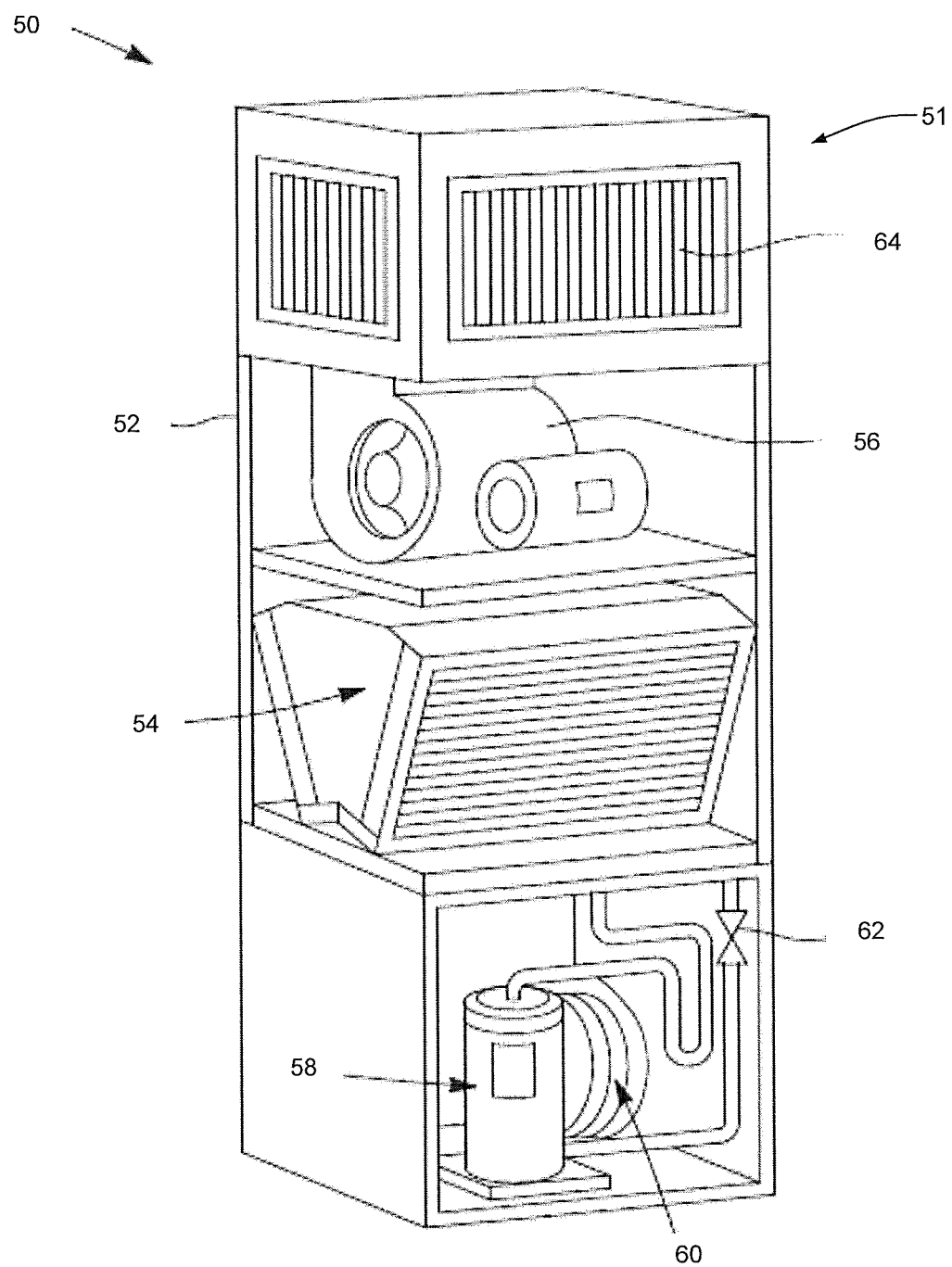
FIG. 1, is an example perspective view of a prior art air conditioner.
Figure 2:
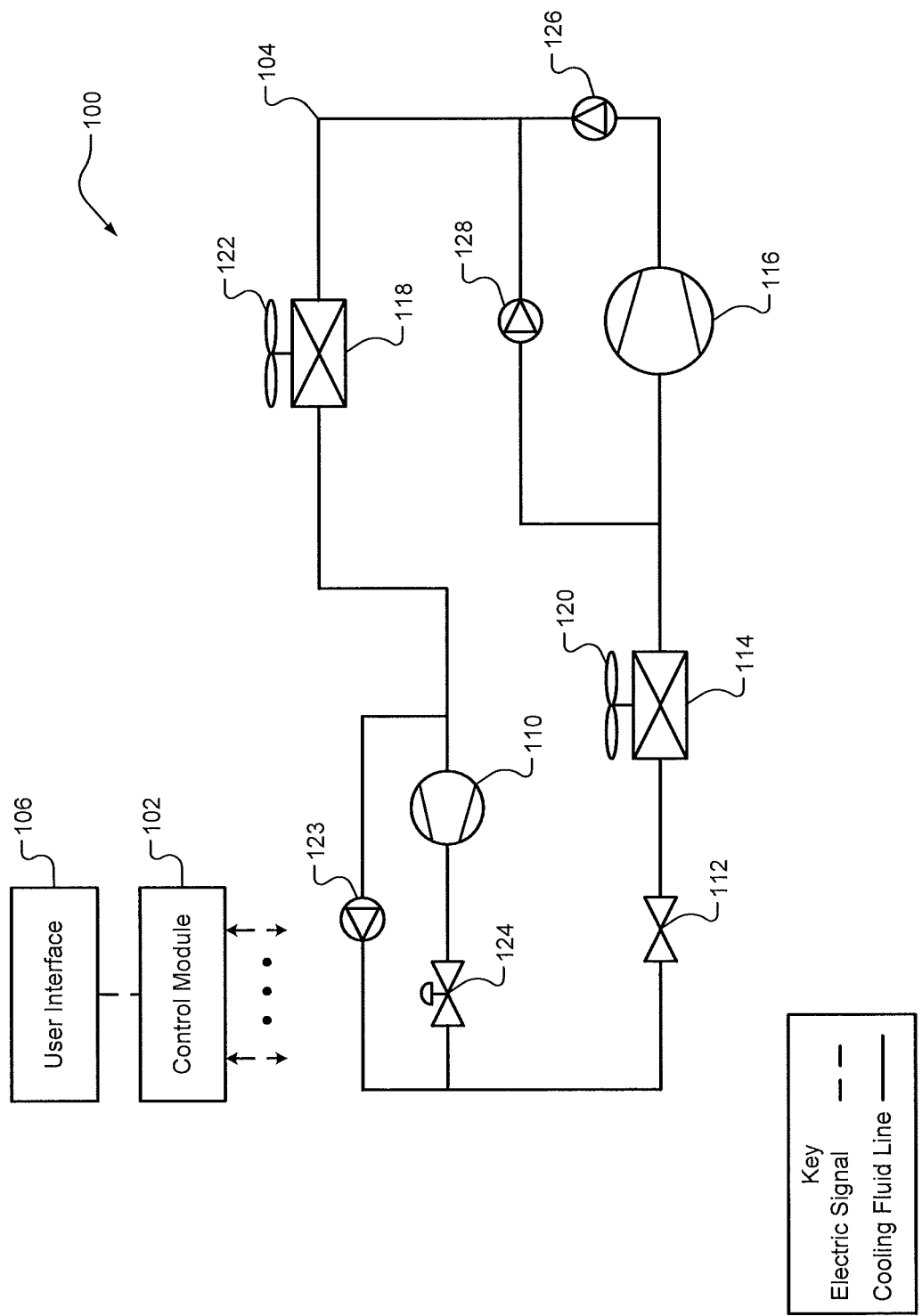
FIG. 2, is a schematic view of an example of a single stage cooling system including a single compressor in accordance with an aspect of the present disclosure.
Figure 3:
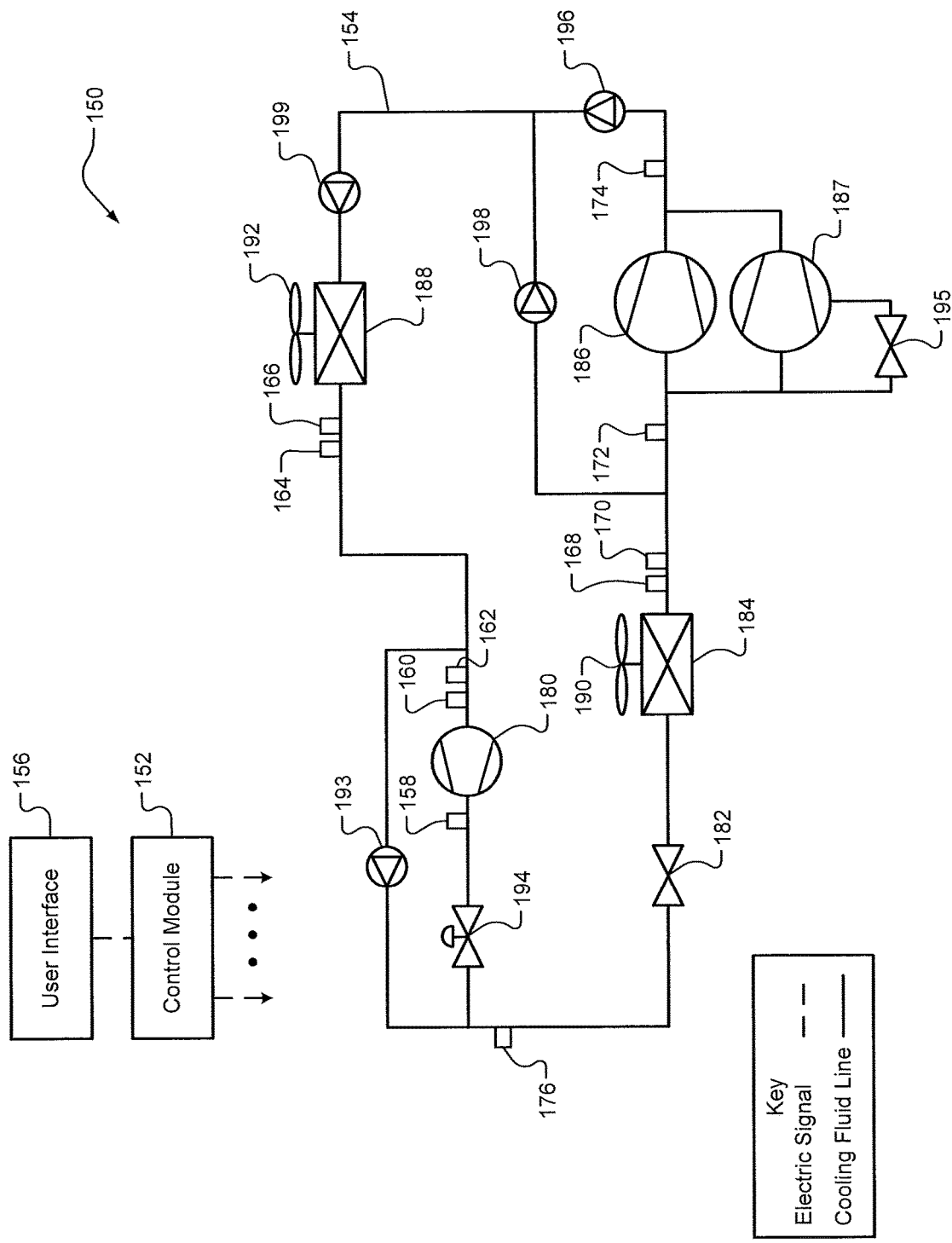
FIG. 3, is a schematic view of an example of a single stage cooling system including multiple compressors in accordance with an aspect of the present disclosure.
Figure 5:
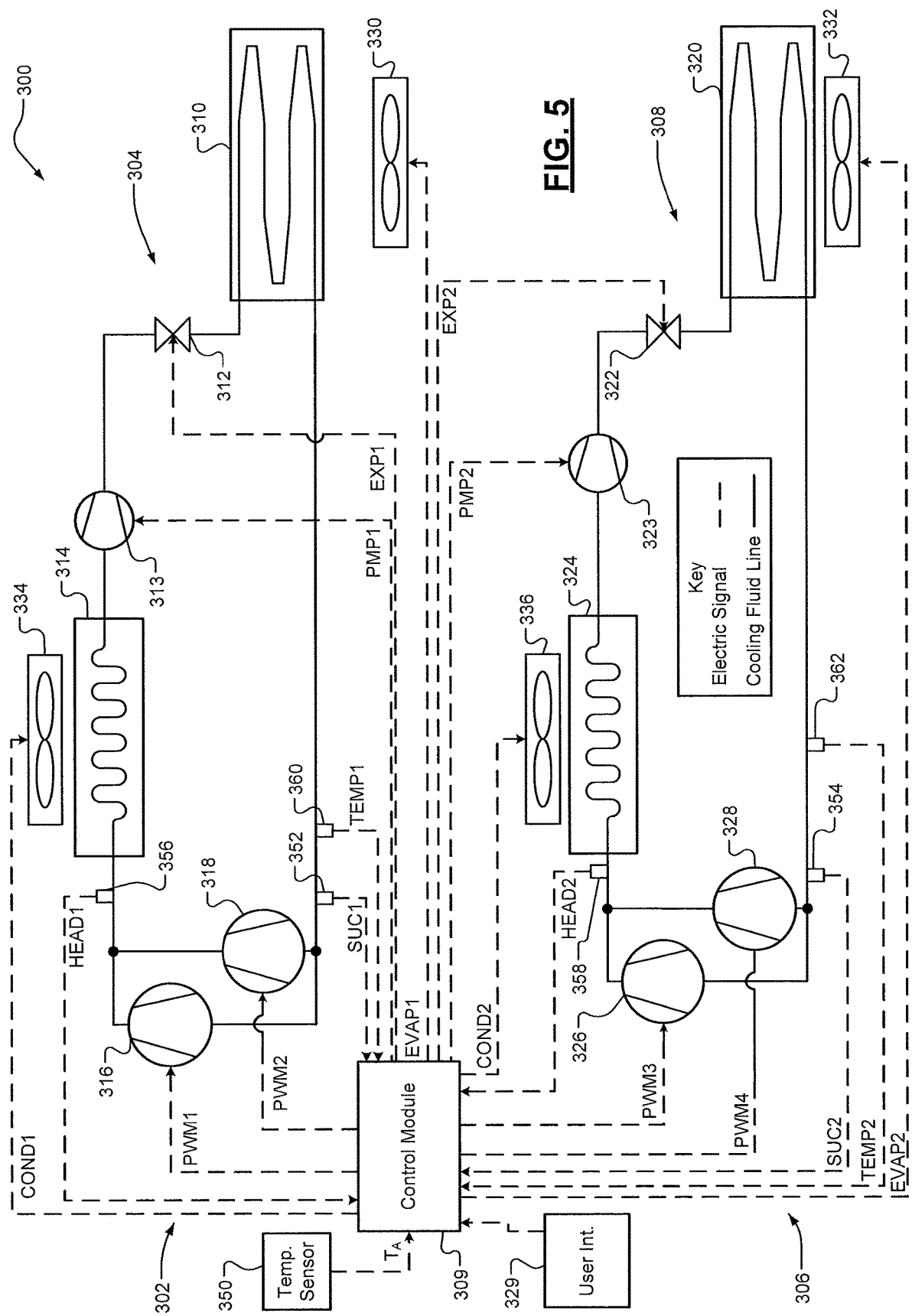
FIG. 5, is a schematic view of an example of a multi-stage cooling system where each stage has multiple compressors in accordance with an aspect of the present disclosure.

FIG. 2 shows a single stage cooling system 100 including a control module 102 and a cooling circuit 104. The control module 102 controls operation of the cooling circuit 104. This control may be based on inputs received from a user interface 106 and/or information received from sensors. Example sensors that may be included are shown in FIGS. 3 and 5. As an example, one of the user inputs and/or parameters determined based on the user inputs may be a request for a call for cooling percentage (CFC %).

As used herein call for cooling (CFC) means the cooling demand, which is the actual cooling that a cooling system is being called on to provide. Typically, an amount of CFC is expressed as a percentage of an overall or nominal maximum cooling capacity of the cooling system. An amount of CFC may be expressed other than as a percentage. For example, an amount of CFC may be expressed in terms of power, such as kilowatts (Kw). By way of example only, the cooling system may have an overall capacity of 125 Kw and if it being called on to provide 62.5 Kw of cooling, the amount of CFC may be expressed as 62.5 Kw and/or as 50%.

The cooling circuit 104 includes a pump 110, an expansion valve 112, an evaporator 114, a compressor 116, and a condenser 118. The compressor 116 may be a fixed speed, digital or variable speed compressor. The cooling circuit 104 further includes an evaporator fan 120 (or blower) and a condenser fan 122, which transfer air respectively across the evaporator 114 and the condenser 118. The cooling circuit 104 may further include a first check valve 123, a solenoid valve 124, a second check valve 126 and a third check valve 128. The control module 102 controls operation of the pump 110, the expansion valve 112, the compressor 116, the evaporator fan 120 and the condenser fan 122. This control may be based on inputs received from a user interface 106, information received from sensors and/or a CFC %. The control module 102 controls an ON/OFF state and may control speeds of the pump 110, the compressor 116, the evaporator fan 120 and the condenser fan 122 based on the CFC %. The cooling system 100 and cooling circuit 104 may be operated as described below with respect to the method of FIG. 7.

FIG. 3 shows a single stage cooling system 150 including a control module 152 and a cooling circuit 154. The control module 152 controls operation of the cooling circuit 154. This control may be based on inputs received from a user interface 156 and/or information received from sensors. Example sensors 158, 160, 162, 164, 166, 168, 170, 172, 174, 176, which may each be a temperature and/or pressure sensor are shown. As an example, one of the user inputs and/or parameters determined based on the user inputs may be a request for a CFC %.

The cooling circuit 154 includes a pump 180, an expansion valve 182, an evaporator 184, a tandem set of compressors including a first compressor 186 and a second compressor 187, and a condenser 188. The compressors 186, 187 may be a fixed speed, digital or variable speed compressor. Each of the compressors 186, 187 may be a fixed capacity scroll compressor or a variable capacity scroll compressor. The fixed capacity scroll compressors may be activated (powered ON) and deactivated (powered OFF) based on control signals generated by the control module 152. The variable capacity scroll compressors may be controlled via a respective digital signal received from the control module 152.

The cooling circuit 154 further includes an evaporator fan 190 and a condenser fan 192, which transfer air respectively across the evaporator 184 and the condenser 188. The cooling circuit 154 may further include a first check valve 193, a first solenoid valve 194, a second solenoid valve 195, a second check valve 196, a third check valve 198 and a fourth check valve 199. The control module 152 controls operation of the pump 180, the expansion valve 182, the compressors 186, 187, the evaporator fan 190 and the condenser fan 192. This control may be based on inputs received from a user interface 156, information received from sensors 158, 160, 162, 164, 166, 168, 170, 172, 174, 176 and/or a CFC %. The control module 152 controls an ON/OFF state and may control speeds of the pump 180, the compressors 186, 187, the evaporator fan 190 and the condenser fan 192 based on the CFC %. The cooling system 150 and cooling circuit 154 may be operated as described below with respect to the method of FIG. 7.

Figure 4:
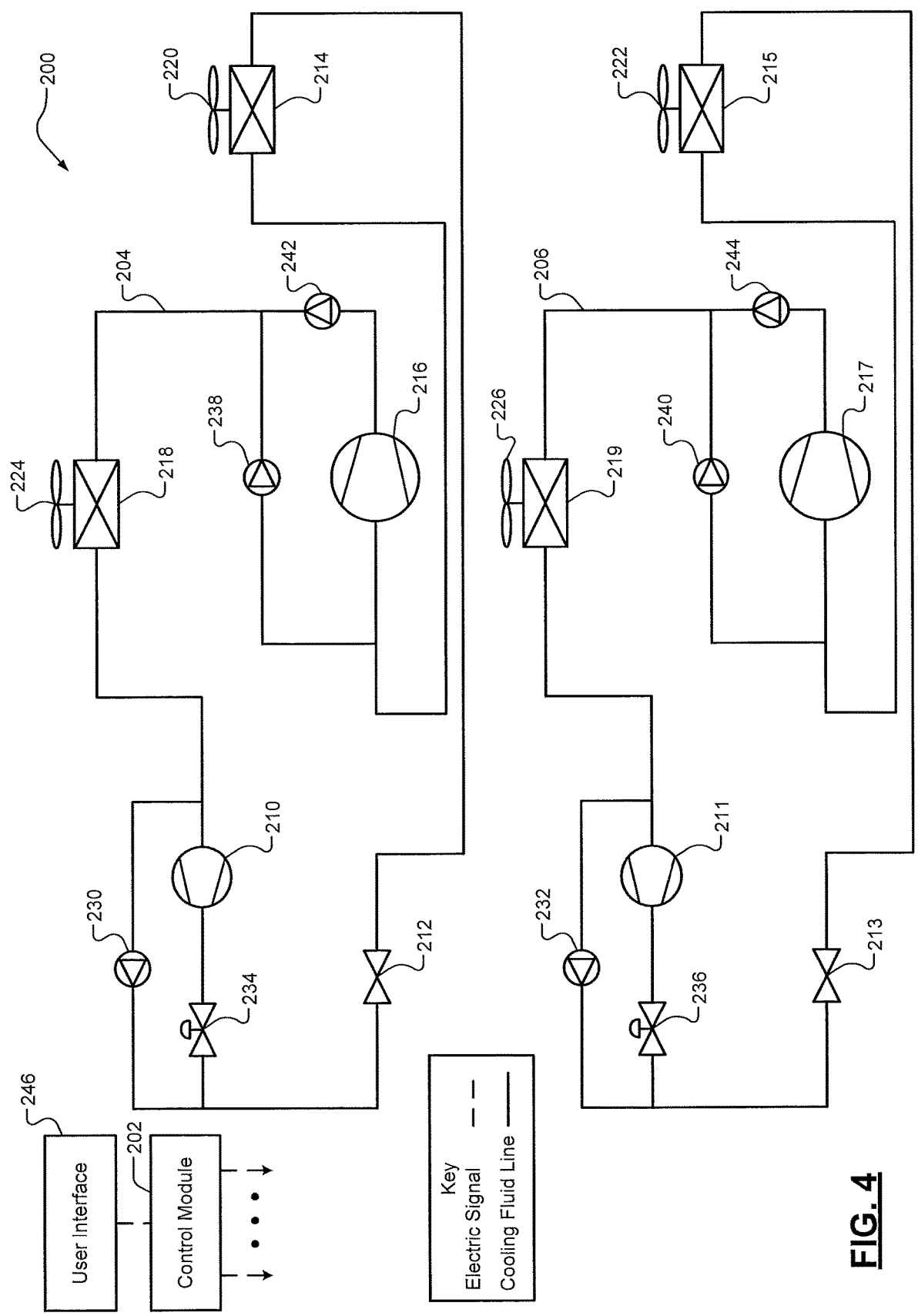
FIG. 4, is a schematic view of an example of a multi-stage cooling system where each stage has a single compressor in accordance with an aspect of the present disclosure.

FIG. 4 shows a dual stage cooling system 200 including a control module 202 and cooling circuit 204, 206. The control module 202 controls operation of the cooling circuits 204, 206. This control may be based on inputs received from a user interface 246 and/or information received from sensors. Example sensors that may be included are shown in FIGS. 3 and 5. The sensors of FIG. 3 may be implemented on each of the cooling circuits 204, 206. As an example, one of the user inputs and/or parameters determined based on the user inputs may be a request for a CFC %.

The cooling circuits 204, 206 include pumps 210, 211, expansion valves 212, 213, evaporators 214, 215, compressors 216, 217, and condensers 218, 219. The compressors 216, 217 may each be a fixed speed, digital or variable speed compressor. The cooling circuits 204, 206 further include evaporator fans 220, 222 and condenser fans 224, 226, which transfer air respectively across the evaporators 214, 215 and the condensers 218, 219. The cooling circuits 204, 206 may further include first check valves 230, 232, solenoid valves 234, 236, second check valves 238, 240 and third check valves 242, 244. The control module 202 controls operation of the pumps 210, 212, the expansion valves 212, 213, the compressors 216, 217, the evaporator fans 220, 222 and the condenser fans 224, 226. This control may be based on inputs received from a user interface 246, information received from sensors and/or a CFC %. The control module 202 controls an ON/OFF state and may control speeds of the pumps 210, 212, the compressors 216, 217, the evaporator fans 220, 222 and the condenser fans 224, 226 based on the CFC %. The cooling system 200 and cooling circuits 204, 206 may be operated as described below with respect to the method of FIG. 9.

FIG. 5 shows a cooling system 300 that includes an upstream cooling stage 302 with an upstream (or first) cooling circuit 304 and a downstream (or second) cooling stage 306 with a downstream cooling circuit 308. The cooling circuits 304, 308 are controlled via a control module 309. Although two cooling circuits are shown, a different number of cooling circuits may be included. The upstream cooling circuit 304 includes a first evaporator 310, a first expansion valve 312, a first pump 313, a first condenser 314, a first compressor 316, and a second compressor 318. The downstream cooling circuit 308 includes a second evaporator 320, a second expansion valve 322, a second pump 323, a second condenser 324, a third compressor 326, and a fourth compressor 328. The evaporators 310, 320 have respective evaporator fans 330, 332, which may be rotated via respective fan motors. The condensers 314, 324 have respective condenser fans 334, 336, which may be rotated via respective fan motors. The motors of the fans 330, 332, 334, 336 may be controlled by the control module 309. The motors may be variable speed motors. This also holds true for the fans of FIGS. 2-4.

The control module 309 may generate condenser fan signals COND1, COND2, evaporator fan signals EVAP1, EVAP2, expansion valve signals EXP1, EXP2, pump signals PMP1, PMP2, and compressor signals PWM1, PWM2, PUMP3, PUMP4 to control the fans 330, 332, 334, 336, expansion valves 312, 322, the pumps 313, 323, and the compressors 316, 318, 326, 328.

Although not shown in FIG. 5, check valves similar to the check valves 230, 232, 238, 240 of FIG. 4 may be included to bypass the pumps 313, 323 and the compressors 316, 318, 326, 328. The check valves may be controlled by the control module 309.

The control module 309 may control the fans 330, 332, 334, 336, the expansion valves 312, 322, and/or the compressors 316, 318, 326, 328 based on signals from various sensors. The sensors may include, for example, an ambient temperature sensor 350, suction pressure sensors 352, 354, head pressure sensors 356, 358 and/or compressor inlet (or evaporator outlet) temperature sensors 360, 362. The ambient temperature sensor 350 may be an outdoor ambient temperature sensor and generate an ambient temperature signal TA. The suction pressure sensors 352, 354 generate suction pressure signals SUC1, SUC2 and detect pressures of fluid received by the compressors 316, 318, 326, 328. The head pressure sensors 356, 358 generate head pressure (or discharge pressure) signals HEAD1, HEAD2 and detect pressures of fluid out of the compressors 316, 318, 326, 328. The temperature sensors 360, 162 detect temperatures of fluids (i) downstream from the evaporators 310, 320, and (ii) between the evaporators 310, 320 and the compressors 316, 318, 326, 328.

The evaporators 310, 320 may be micro-channel (MC) cooling coil assemblies and/or includes a MC heat exchanger and/or may be fin-and-tube cooling coil assemblies. The expansion valves 312, 322 may be mechanical and/or electronic based expansion valves (e.g., EEVs) and/or thermostatic expansion valves. Each of the condensers 314, 324 may be of a variety of types, such as an air-cooled condenser, a water-cooled condenser, or glycol cooled condenser. The condensers 314, 324 may include heat rejection devices that transfer heat from return fluids to a cooler medium, such as outside air. The heat rejection devices may include air or liquid cooled heat exchangers.

In each of the circuits 304, 308, a cooling fluid (or refrigerant) is circulated by a respective pair of the compressors 316, 318, 326, 328 and/or by the pumps 313, 323. The fluids flow from the compressors 316, 318, 326, 328, through the condensers 314, 324, expansion valves 312, 322, and evaporators 310, 320 and back to the compressors 316, 318, 326, 328. The evaporators 310, 320 may be arranged in stages such that air flows in a serial fashion first through the upstream evaporator 310 and then through the downstream evaporator 320. By having multiple cooling stages arranged for serial air flow, a temperature differential across the evaporators 310, 320 is reduced. This in turn allows the evaporators 310, 320 to operate at different pressure levels and allows the pressure differences between the respective evaporators 310, 320 and condensers 314, 324 to be reduced.

Since compressor power is a function of a pressure difference between an evaporator and a condenser, a lower pressure difference is more energy efficient. Each of the cooling circuits 304, 308 may include a pair of tandem compressors (e.g., compressors 316, 318 or compressors 326, 328). Each of the tandem compressors may be a fixed capacity scroll compressor (e.g., compressors 316, 326) or a variable capacity scroll compressor (e.g., compressors 318, 328). The fixed capacity scroll compressors may be activated (powered ON) and deactivated (powered OFF) based on control signals generated by the control module 309. The variable capacity scroll compressors may be controlled via a respective digital signal received from the control module 309.

Each of the cooling circuits 304, 308 may include a tandem set of compressors. Each of the tandem sets may include two compressors of equal volumetric displacement. The first compressor may be a digital pulse width modulation (PWM) scroll compressor that receives a PWM percentage signal to control speed and capacity of the first compressor. The second compressor may be a fixed speed scroll compressor with simply ON/OFF capacity control. Suction and discharge lines of these two compressors may be piped in parallel to form the tandem set. As an example, compressors 316, 326 may be PWM scroll compressors and compressors 318, 328 may be fixed speed scroll compressors. The fixed speed scroll compressors may receive ON/OFF control signals rather than PWM signals from the control module 309.

Although not shown in FIG. 5, the cooling system 300 may include the check valves and solenoid valves shown in FIG. 4.

Figure 6:
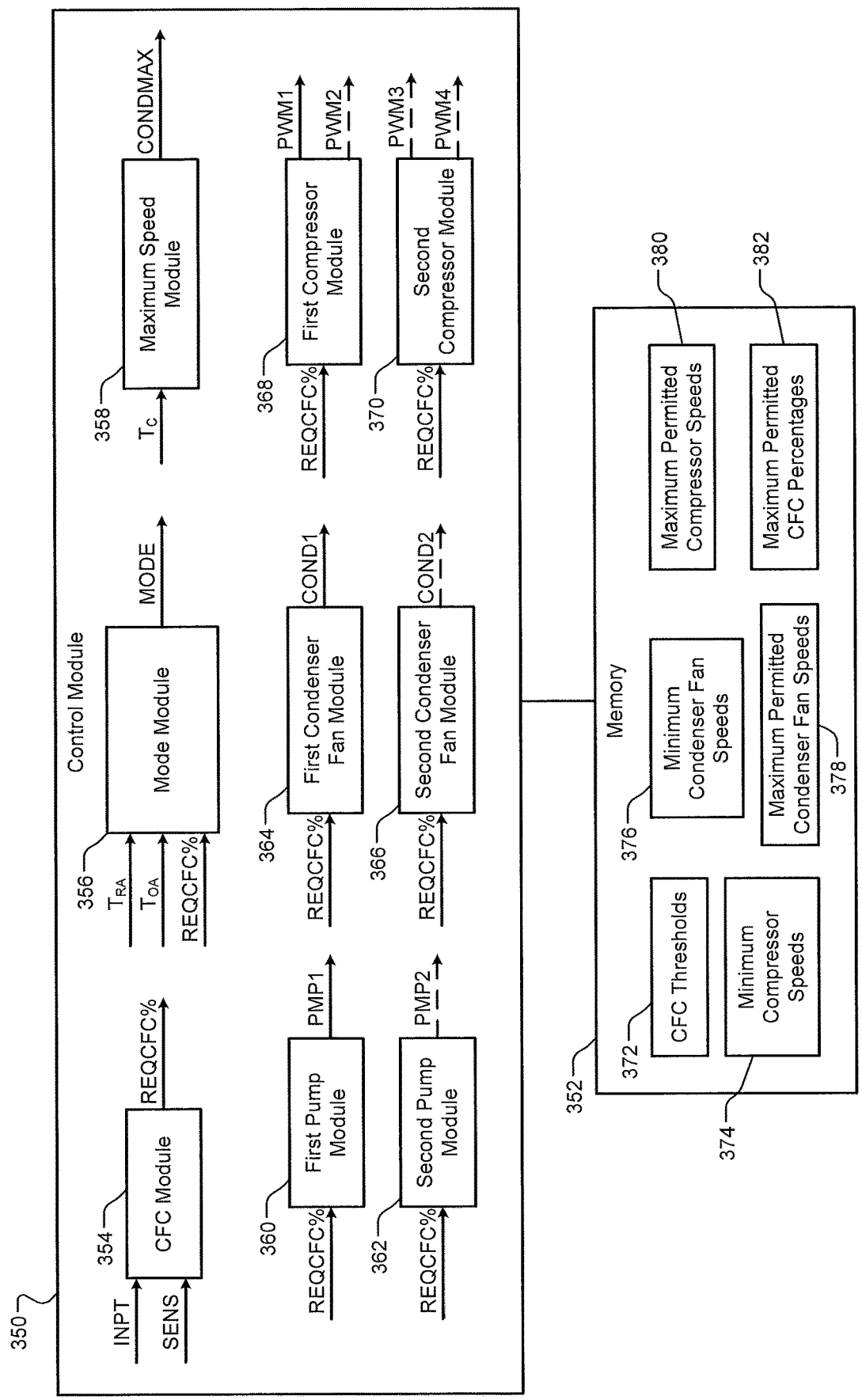
FIG. 6 is a functional block diagrammatic view of an example of a control module and a memory in accordance with an aspect of the present disclosure.

FIG. 6 shows a control module 350 and a memory 352. The control modules 102, 152, 202, 309 of FIGS. 2-5 may be configured the same as or similarly as the control module 350 and have access to the memory 352. The control module 350 may include a CFC module 354, a mode module 356, a maximum speed module 358, pump modules 360, 362, condenser fan modules 364, 366 and compressor modules 368, 370. The CFC module 354 may receive a user input INPT and sensor signals SENS from sensors (e.g., the sensors shown in FIGS. 3 and 5) and generate a requested CFC % signal REQCFC % based on the user input and the sensor signals.

The mode module 356 receives a return air temperature signal $T_{RA}$, an outdoor air temperature signal $T_{OA}$, and REQCFC % and determines an operating mode. The operating mode may be a DX mode, a PRE mode, or a mixed mode. The mode module generates a signal MODE indicating the operating mode. The signal MODE may be generated based on $T_{RA}$, $T_{OA}$, a difference between $T_{RA}$ and $T_{OA}$, a cooling load, and/or a cooling capability of a cooling system. As an example, when $T_{RA}$ minus $T_{OA}$ is greater than 45° F., then the mode module 356 may operate in the DX mode. As another example, when $T_{OA}$ is less than 35° F., then the mode module 356 may operate in the DX mode. As yet another example, if the cooling load is less than the cooling capability, then the mode module 356 may operate in the PRE mode or the mixed mode. The cooling circuits of FIGS. 2-5 may be operated in DX, PRE and/or mixed modes.

While in the PRE mode, a compressor is OFF and the liquid pump is ON and pumps refrigerant in a liquid phase around a cooling circuit without the refrigerant being compressed by the compressor. The compressor is ON during the DX mode. In an aspect, the liquid pump is turned OFF when in the DX mode. In a dual-stage arrangement, each cooling circuit may operate in the DX mode or the PRE mode. The PRE mode may be implemented when the outdoor temperature is sufficiently low to provide the requisite cooling to the refrigerant being circulating in the cooling circuit.

It should be understood that a cooling system can have less than all these elements, and can have various combinations of them. For example, the cooling system may not have staged cooling but have a cooling circuit that includes a DX cooling circuit and a pumped refrigerant economization circuit. In this aspect, a tandem digital scroll may or may not be utilized. For example, a first stage may operate in the PRE mode and a second stage that receives air from the first stage may operate in the DX mode. This allows the stage operating in the PRE mode to receive the warmest air and the stage operating in the DX mode to receive cooler air from the first stage. This minimizes the loading on the second stage, which tends to consume more energy than the first stage, since the second stage is running one or more compressors, whereas the first stage is running a pump.

In accordance with another aspect of the present disclosure, a cooling system, which may include a computer room air conditioning (CRAC) unit, includes a cooling circuit with a pump enabling the system to be run in a PRE mode when the temperature outside is cold enough to cool the cooling fluid circulating in the cooling circuit and bypass the corresponding compressor. The cooling fluid may illustratively be a phase change refrigerant having a vapor phase and a liquid phase. The pump circulates the cooling fluid in a liquid phase with the compressor being byassed. This cooling system then uses the pump instead of the compressor to pump the cooling fluid in its liquid phase and circulate the cooling fluid when the outside air temperature is low enough to provide the heat exchange without compressing the refrigerant in its vapor phase to a higher pressure/condensing temperature. The PRE mode significantly increases a sensible coefficient of performance (COP) of the cooling system when the cooling system switches to the PRE mode.

A conventional DX air conditioning system contains an evaporator, a compressor, a condenser and an expansion device. Often the air being cooled is at a lower temperature than the outside air. Because of this, a compressor is required to raise the pressure of the refrigerant in its vapor phase, and therefore it's condensing temperature, to a higher temperature than the outside air so that the heat can be rejected. In any application in which heat is rejected to the outdoors even in the middle of the winter, the need to compress the cooling fluid consumes energy unnecessarily.

When the outdoor temperature becomes low enough to provide the overall required temperature difference between the inside air from which the heat is removed and the outside air to which the heat is rejected, there is no need to compress the refrigerant in its vapor phase to a higher pressure/temperature. When that is the case, the cooling system in accordance with this aspect of the present disclosure switches from DX (compressor) mode to the PRE mode. In the PRE mode, the refrigerant is pumped in its liquid phase by a liquid pump to circulate the refrigerant in the cooling circuit without compressing the refrigerant in its vapor phase. In the PRE mode, the pump consumes roughly 1/10 of the power consumed by the compressor during the DX mode.

The temperature at which the control module of the cooling system decides to switch from one mode to the other may be based on the difference between the indoor and outdoor temperatures, and the heat load on the cooling system. When the controller decides to switch from DX (compressor) mode to PRE mode, the compressor is turned OFF and the pump is turned ON. In the PRE mode, the refrigerant may be bypassed around the compressor, while in DX (compressor) mode, the refrigerant may be bypassed around the pump.

The modules 360, 362, 364, 366, 368, 370, based on the REQCFC %, may generate output signals PMP1, PMP2, COND1, COND2, PWM1, PWM2, PWM3, PWM4 and provide these signals to the corresponding pumps, condenser fan motors, and compressors. Dashed signal lines refer to signals that may not be generated depending upon the implementation. For example if the control module 350 is being used for one of the systems of FIGS. 2-4, one or more of the dashed signals may not be generated. The memory 352 stores CFC thresholds 372, predetermined minimum compressor speeds 374, predetermined minimum condenser fan speeds 376, maximum permitted condenser fan speeds 378, maximum permitted compressor speeds 380, maximum permitted CFC percentages 382 and/or other parameters disclosed herein. The parameters may be determined and/or generated during the methods of FIGS. 7, 9, 11 and 13.

The cooling systems of FIGS. 2-5 may be operated using numerous methods, example methods are illustrated in FIGS. 7, 9, 11 and 13. Although operations of FIGS. 7, 9, 11 and 13 are described as being performed by certain modules of FIG. 6, any of the stated operations may be performed by the control module 350. The methods of FIGS. 7, 9, 11 and 13 may be performed when an outdoor ambient temperature is less than a predetermined temperature for operating in a PRE or mixed mode.

The following methods are described with respect to plots shows in FIGS. 8, 10, 12 and 14. The plots show different example predetermined CFC % s identified as A %, B %, C %, D %, E %. The predetermined CFC % s of one of the plots is not necessarily the same predetermined CFC % s for the other plots. For example, the A % for one of the plots may be different than the A % for the other plots. Also, relationships between the predetermined CFC % s of one plot may be different than the relationships between the predetermined CFC % for the other plots. In other words, an A % may be greater than a B % for one of the plots and a B % may be greater than an A % for another plot.

Figure 7:
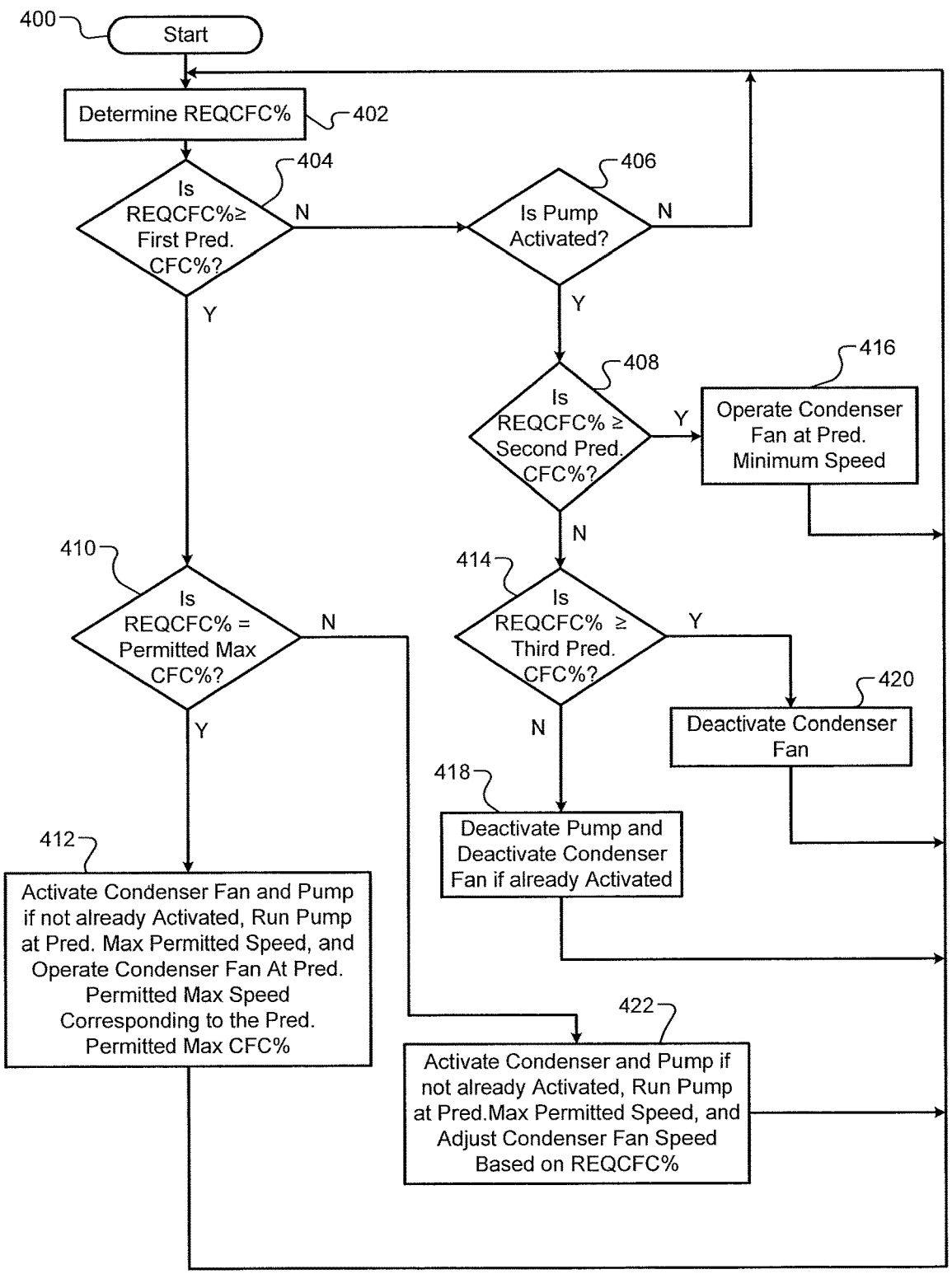
FIG. 7 is a logic flow diagram illustrating a method of operating a single stage cooling system having one or more compressors during a pumped refrigerant economizer mode in accordance with an aspect of the present disclosure.
Figure 8:
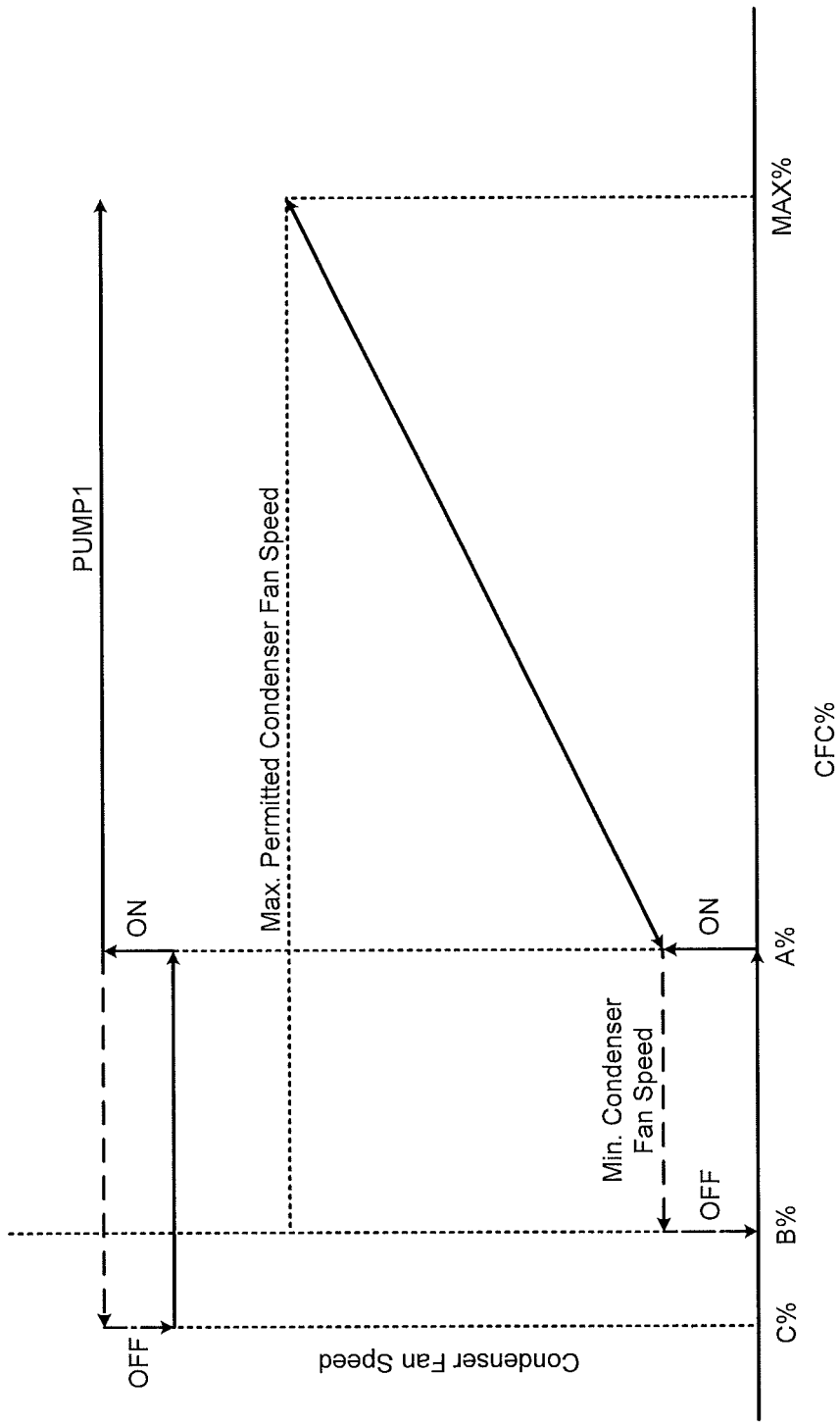
FIG. 8 is an example of a plot illustrating pump and condenser fan speeds relative to a call for cooling percentage for a single stage cooling system in accordance with an aspect of the present disclosure.

FIG. 7 shows a method of operating a single stage cooling system (e.g., one of the cooling systems 100, 150 of FIGS. 2-3) having one or more compressors during a PRE mode. Although the following operations are primarily described with respect to the implementations of FIGS. 2-3, 6 and 8, the operations may be easily modified to apply to other implementations of the present disclosure. The operations may be iteratively performed. FIG. 8 shows an example of a plot illustrating pump and condenser fan speeds relative to a CFC % for the cooling system. During the method of FIG. 7, the corresponding compressor is OFF and/or bypassed.

The method may begin at 400. At 402, the CFC module 354 determines a requested CFC %, as described above. At 404, the first pump module 360 and/or the first condenser fan module 364 determines whether the requested CFC % is greater than or equal to a first predetermined CFC % (e.g., A %). If the requested CFC % is greater than or equal to the first predetermined CFC %, then operation 410 is performed, otherwise operation 406 is performed. At 406, the first pump module 360 determines whether a pump (e.g., one of the pumps 110, 180) is activated. If this is true, operation 408 is performed, otherwise operation 402 is performed.

At 408, the first condenser fan module 364 determines whether the requested CFC % is greater than or equal to a second predetermined CFC % (e.g., B %). If this is true, the operation 416 is performed, otherwise operation 414 is performed.

At 410, the first condenser fan module 364 determines whether the requested CFC % is equal to a permitted maximum CFC %. The permitted maximum CFC % may be predetermined and/or determined by the control module 350. The permitted maximum CFC % may be determined based on, for example, a temperature of the cooling fluid circulating through the corresponding cooling circuit and/or one or more other parameters disclosed herein. If the requested CFC % is equal to the permitted maximum CFC %, then operation 412 is performed, otherwise operation 422 is performed.

At 412, the first pump module 360 activates the pump (e.g., one of the pumps 110, 180) if not already activated and operates the pump at a predetermined maximum permitted speed. The first condenser fan module 364 activates the condenser fan if not already activated and operates the condenser fan at a predetermined maximum permitted speed. The predetermined maximum permitted speeds of the pump and the condenser fan may correspond to the predetermined maximum CFC %, which may be determined by the maximum speed module 358, as described below with respect to FIG. 15. Operation 402 may be performed subsequent to operation 412.

At 414, the first condenser fan module 364 and/or the first pump module 360 determines whether the requested CFC % is greater than or equal to a third predetermined CFC % (e.g., C %). If this is true, then operation 420 is performed, otherwise operation 418 is performed.

At 416, the first condenser fan module 364 operates the condenser fan at the predetermined minimum speed. The predetermined minimum speed is greater than 0. Operation 402 may be performed subsequent to operation 416. At 418, the first pump module 360 may deactivate the pump, such that the speed of the pump is 0. The first condenser fan module may deactivate the condenser fan if already activated, such that the speed of the condenser fan is 0. Operation 402 may be performed subsequent to operation 418. At 420, the first condenser fan module 364 may deactivate the condenser fan, such that the speed of the condenser fan is 0. Operation 402 may be performed subsequent to operation 420.

At 422, the first pump module 360 activates the pump if not already activated and operates the pump at a predetermined speed (e.g., a full ON or predetermined maximum permitted speed). A predetermined maximum permitted speed may be less than or equal to a peak speed that the pump is capable of running at per manufacturer specifications. In addition, the first condenser fan module 364 activates a condenser fan (e.g., one of the condenser fans 122, 192) if not already activated and operates the condenser fan based on the requested CFC %. The speed of the condenser fan may be directly related to the CFC %, such that when the CFC % is increased, the speed of the condenser fan is increased and vice versa. The first compressor module 366 may maintain one or more compressors (e.g., one or more of compressors 116, 186, 187) in an OFF state while the speed of the first condenser fan is adjusted based on the requested CFC %.

Figure 9:
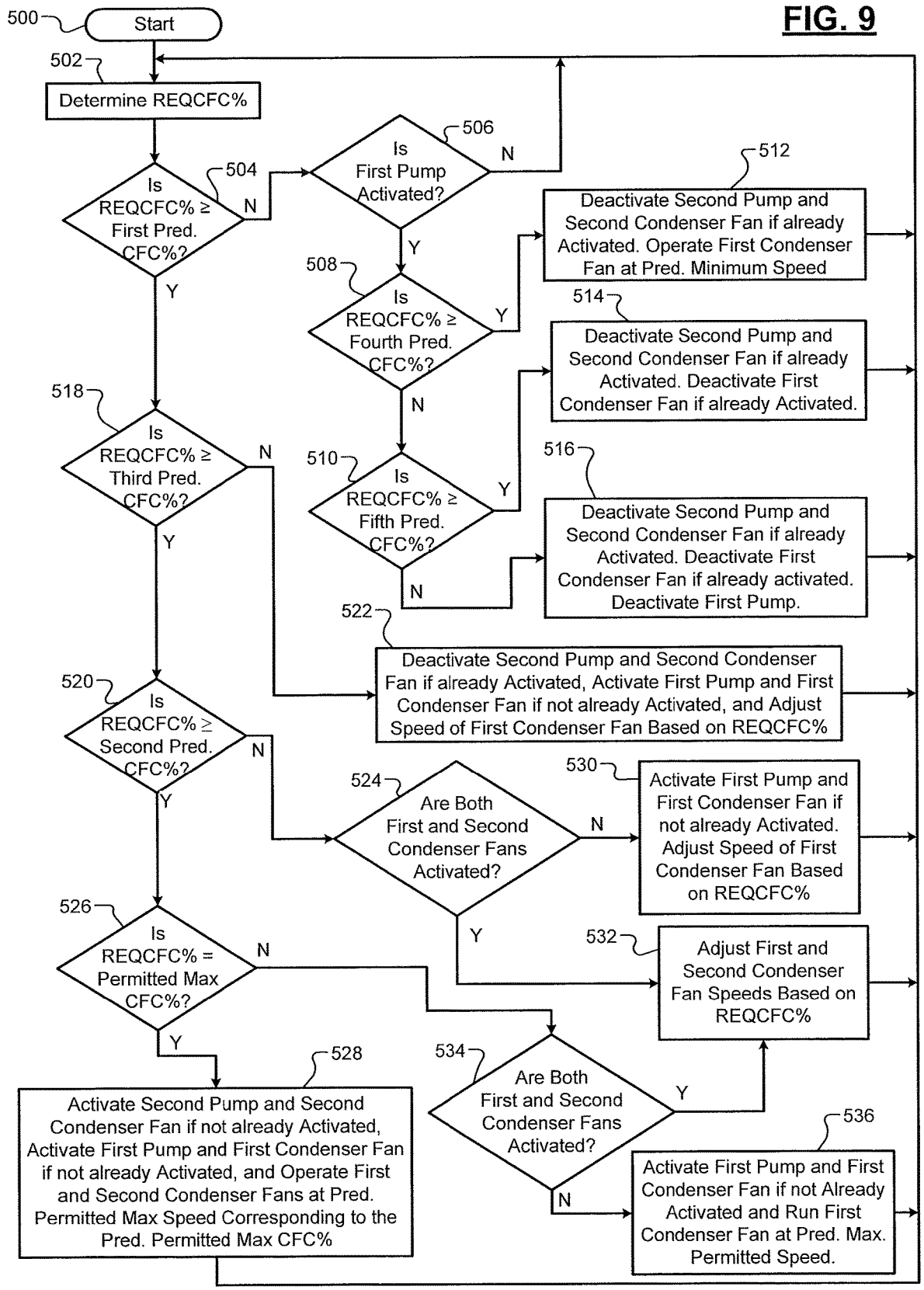
FIG. 9 is a logic flow diagram illustrating a method of operating a multi-stage cooling system having multiple condenser fans during a pumped refrigerant economizer mode in accordance with an aspect of the present disclosure.
Figure 10:
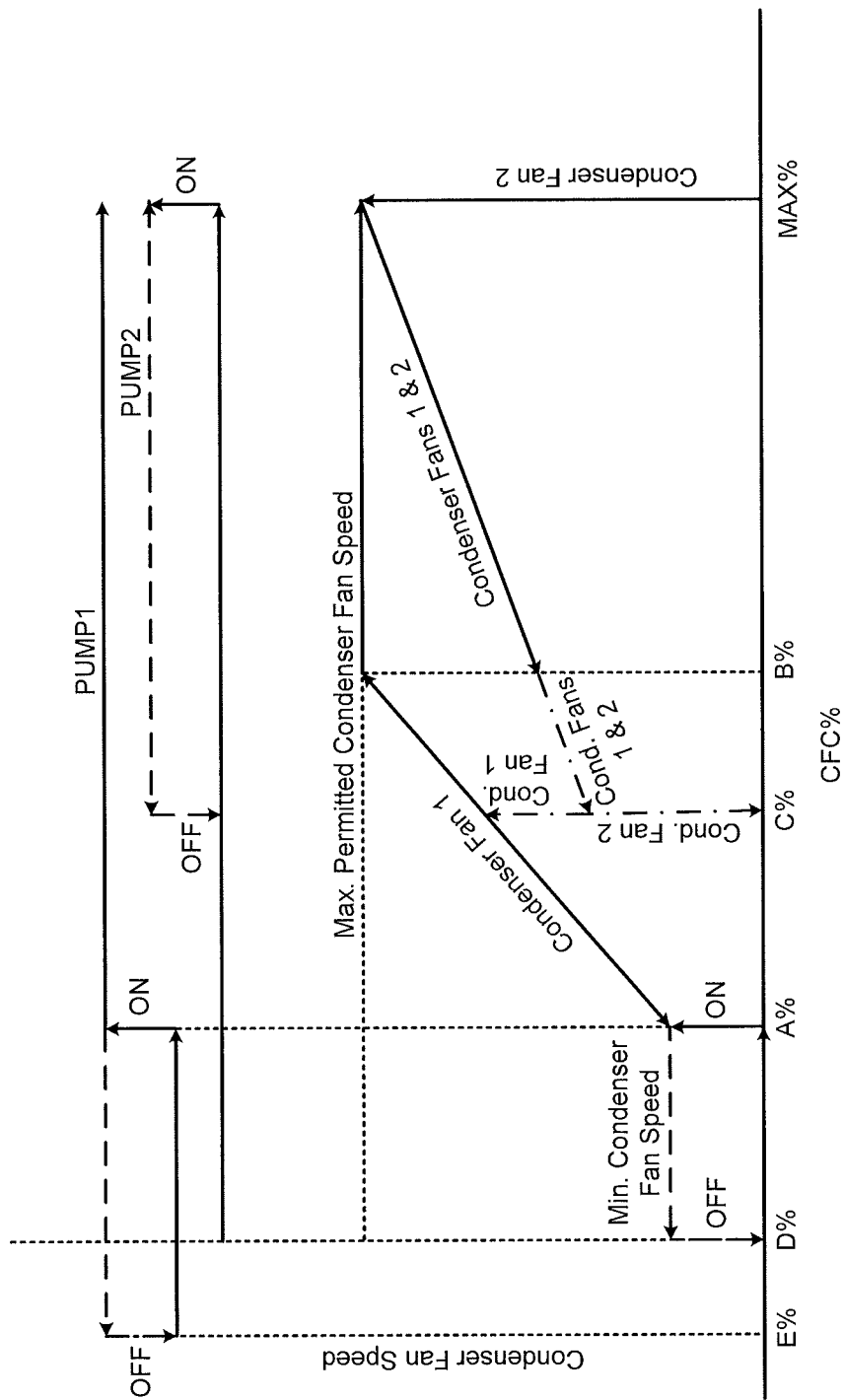
FIG. 10 is an example of a plot illustrating speeds of pumps and condenser fans relative to a call for cooling percentage for a dual stage cooling system operating in a pumped refrigerant economizer mode in accordance with an aspect of the present disclosure.
Figure 11:
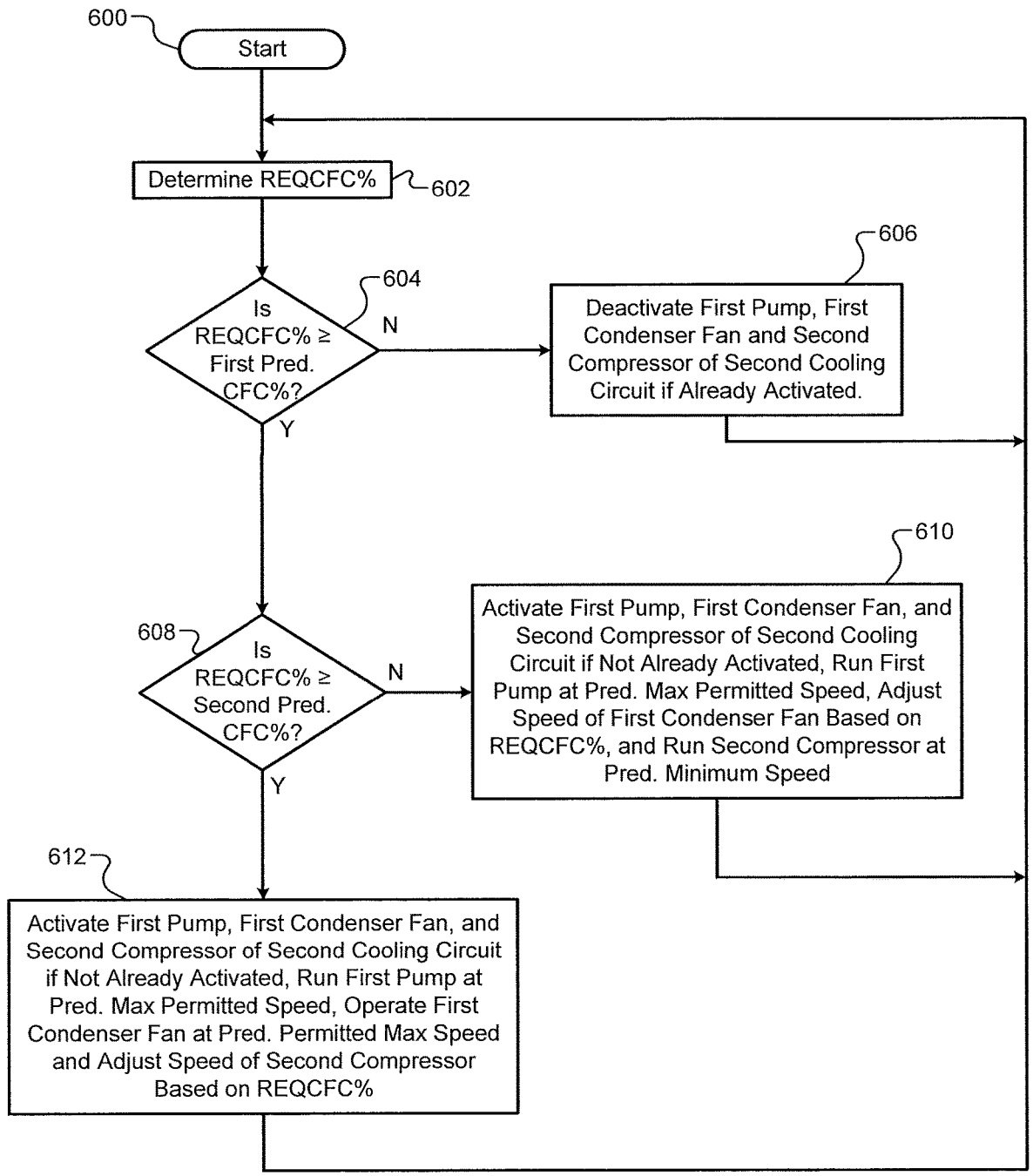
FIG. 11 is a logic flow diagram illustrating a method of operating a multi-stage cooling system having a single compressor during a mixed mode in accordance with an aspect of the present disclosure.

FIG. 9 shows a method of operating a multi-stage cooling system (e.g., the cooling system 200 of FIG. 4) having multiple condenser fans during a PRE mode. Although the following operations are primarily described with respect to the implementations of FIGS. 4, 6 and 10, the operations may be easily modified to apply to other implementations of the present disclosure. The operations may be iteratively performed. FIG. 10 shows an example of a plot illustrating speeds of pumps and condenser fans relative to a CFC % for a dual stage cooling system operating in a PRE mode. During the method of FIG. 9, the compressors 216, 217 are OFF and/or bypassed.

The method may begin at 500. At 502, the CFC module 354 determines a requested CFC %, as described above. At 504, the first pump module 360 and/or the first condenser fan module 364 determines whether the requested CFC % is greater than or equal to a first predetermined CFC % (e.g., A %). If the requested CFC % is not greater than or equal to the first predetermined CFC %, then operation 506 is performed, otherwise operation 518 is performed.

At 506, the first pump module 360 determines whether the first pump 210 is activated. If the first pump 210 is activated, then operation 508 is performed, otherwise operation 502 is performed.

At 508, one or more of the modules 360, 362, 364, 366 determine whether the requested CFC % is greater than or equal to a fourth predetermined CFC % (e.g., D %). If this is true, operation 512 is performed, otherwise operation 510 is performed.

At 510, one or more of the modules 360, 362, 364, 366 determine whether the requested CFC % is greater than or equal to a fifth predetermined CFC % (e.g., E %). If this is not true, operation 516 is performed, otherwise operation 514 is performed.

At 512, the second pump module 362 deactivates the second pump 211 and the second condenser fan module 366 deactivates the second condenser fan 226 if already activated. The first condenser fan module 364 may run the first condenser fan 224 at least at a predetermined minimum speed. The predetermined minimum speed is greater than 0.

At 514, the second pump module 362 deactivates the second pump 211 and the second condenser fan module 366 deactivates the second condenser fan 226 if already activated. The first condenser fan module 364 deactivates the first condenser fan 224 if already activated.

At 516, the pump modules 360, 362 and the condenser fan modules 364, 366 deactivate the pumps 210, 211 and the condenser fans 224, 226 if already activates. At 518, one or more of the modules 360, 362, 364, 366 determine whether the requested CFC % is greater than or equal to a third CFC % (e.g., C %). If this is not true, then operation 522 is performed, otherwise operation 520 is performed.

At 520, one or more of the modules 360, 362, 364, 366 determine whether the requested CFC % is greater than or equal to the a second predetermined CFC % (e.g., B %). If this is true, then operation 526 is performed, otherwise operation 524 is performed.

At 522, the modules 362, 366 deactivate the second pump 211 and the second condenser fan 226 if already activated and the modules 360, 364 activate the first pump 210 and the first condenser fan 224 if not already activated. The first condenser fan module 364 adjusts the speed of the first condenser fan 224 based on the requested CFC %.

At 524, one or more of the modules 360, 362, 364, 366 determine whether both of the condenser fans 224, 226 are activated. If this is not true, then operation 530 is performed, otherwise operation 532 is performed.

At 526, one or more of the modules 360, 362, 364, 366 determine whether the requested CFC % is equal to a predetermined maximum permitted speed corresponding to the permitted maximum CFC %. If this is true, then operation 528 is performed, otherwise operation 534 is performed.

At 528, the modules 360, 362, 364, 366 activate the pumps 210, 211 and the condenser fans 224, 226 if not already activated. The modules 364, 366 operate the condenser fans 224, 226 at a predetermined maximum permitted speed, which may correspond to the permitted maximum CFC %.

At 530, the first pump module 360 activates the first pump 210 and the first condenser fan module 364 activates the first condenser fan 224 if not already activated. The first condenser fan module 364 adjusts the speed of the first condenser fan 224 based on the requested CFC %. At 532, the first and second condenser fan modules 364, 366 adjust the speeds of the first condenser fans 224, 226 based on the requested CFC %.

At 534, one or more of the modules 360, 362, 364, 366 determine whether both of the condenser fans 224, 226 are activated. If this is not true, then operation 532 is performed, otherwise operation 536 is performed. At 536, modules 360, 364 activate the first pump 210 and the first condenser fan 224 if not already activated and run the first condenser fan at a predetermined maximum permitted speed.

Figure 12:
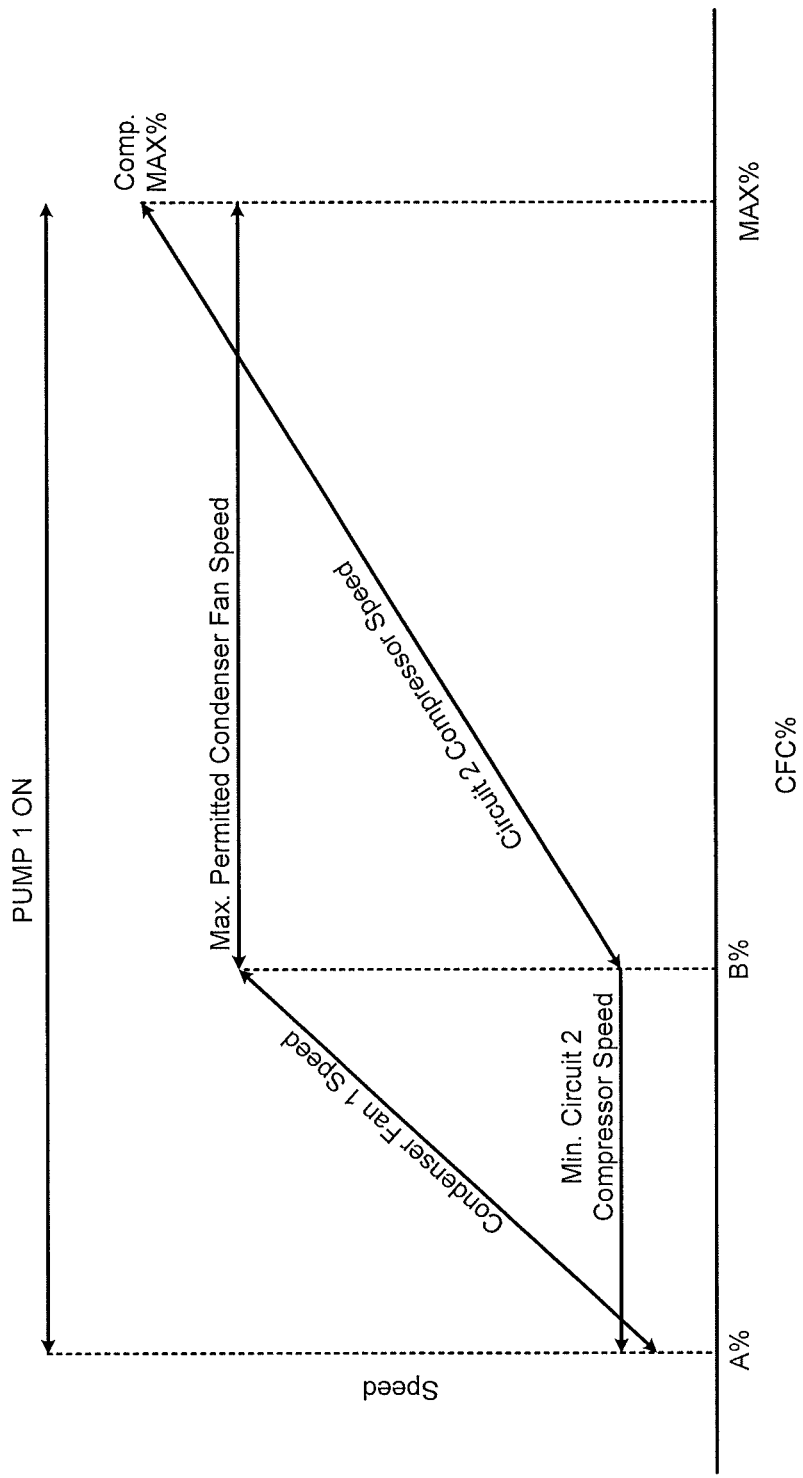
FIG. 12 is an example of a plot illustrating pump, condenser fan and compressor speeds relative to a call for cooling percentage for a dual stage cooling system operating in a mixed mode and having a single compressor per stage in accordance with an aspect of the present disclosure.

FIG. ills a logic flow diagram illustrating a method of operating a multi-stage cooling system having a single compressor during a mixed mode. Although the following operations are primarily described with respect to the implementations of FIGS. 4, 6 and 12, the operations may be easily modified to apply to other implementations of the present disclosure. The operations may be iteratively performed. FIG. 12 shows a plot illustrating pump, condenser fan and compressor speeds relative to a CFC % for a dual stage cooling system operating in a mixed mode and having a single compressor per stage.

The method may begin at 600. At 602, the CFC module 354 determines a requested CFC %, as described above. At 604, the first pump module 360, the first condenser fan module 364 and/or the second compressor module 370 determines whether the requested CFC % is greater than or equal to a first predetermined CFC % (e.g., A %). If the requested CFC % is greater than or equal to the first predetermined CFC %, then operation 608 is performed, otherwise operation 606 is performed.

At 606, the modules 360, 364, 370 deactivate the first pump 210, the first condenser fan 224 and the second compressor 217 if already activated. Operation 602 may be performed subsequent to operation 606.

At 608, one or more of the modules 360, 364, 370 determine whether the requested CFC % is greater than or equal to a second predetermined CFC % (e.g., B %). If this is true, operation 612 is performed, otherwise operation 610 is performed.

At 610, the modules 360, 364, 370 activate the first pump 210, the first condenser fan 224 and the second compressor if not already activated. The first pump module 360 runs the first pump 210 at a first predetermined maximum permitted speed. The first condenser module 364 adjusts the speed of the first condenser fan 224 based on the requested CFC %. The second compressor module 370 runs the second compressor 217 at least at a first predetermined minimum speed. The predetermined minimum speeds is greater than 0. Operation 602 may be performed subsequent to operation 610.

At 612, the modules 360, 364, 370 activate the first pump 210, the first condenser fan 224 and the second compressor if not already activated. The first pump module 360 runs the first pump 210 at the first predetermined maximum permitted speed. The first condenser module 364 runs the first condenser fan 224 at a second predetermined maximum permitted speed. The second compressor module 370 adjusts the speed of the second compressor 217 based on the requested CFC % and up to a predetermined maximum permitted speed, which may correspond to a predetermined maximum CFC % (e.g., MAX %). Operation 602 may be performed subsequent to operation 612.

Figure 13:
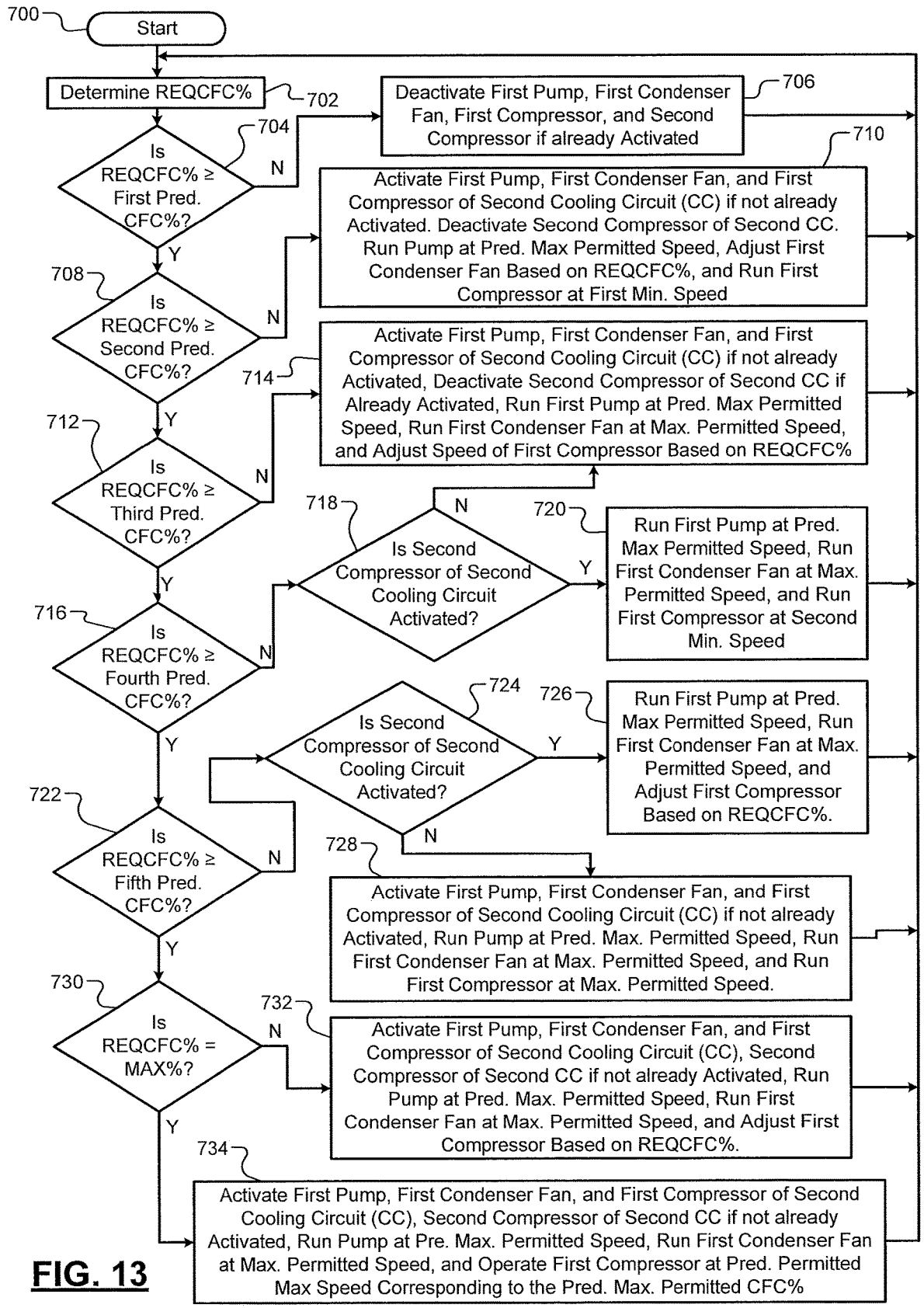
FIG. 13 is a logic flow diagram illustrating a method of operating a multi-stage cooling system having multiple compressors during a mixed mode in accordance with an aspect of the present disclosure.

FIG. 13 is a logic flow diagram illustrating a method of operating a multi-stage cooling system having multiple compressors during a mixed mode. Although the following operations are primarily described with respect to the implementations of FIGS. 5, 6 and 14, the operations may be easily modified to apply to other implementations of the present disclosure. The operations may be iteratively performed. FIG. 14 shows a plot illustrating speeds of a pump, a condenser fan, and compressors relative to a CFC % for a dual stage cooling system operating in a mixed mode and having tandem compressors per stage. During the method of FIG. 13 the compressors 316, 318 are OFF and may be bypassed. During the method of FIG. 13, the condenser fan 336 may also be OFF.

The method may begin at 700. At 702, the CFC module 354 determines a requested CFC %. At 704, the first pump module 360, the first condenser fan module 364, and/or the first compressor module 368 determine whether the requested CFC % is greater than or equal to a first predetermined CFC % (e.g., A %). If this is not true, operation 706 is performed, otherwise operation 708 is performed.

At 706, the modules 360, 364, 370 deactivate the first pump 313, first condenser fan 334, and first compressor 326 and second compressor 328 of the second cooling circuit 308 if not already activated. At 708, one or more of the modules 360, 364, 370 determines whether the requested CFC % is greater than or equal to a second predetermined CFC % (e.g., B %). If this is true operation 712 is performed, otherwise operation 710 is performed.

At 710, the modules 360, 364 and 370 activate the first pump 313, the first condenser fan 334 and the first compressor 326 if not already activated. The second compressor module 370 deactivates the second compressor 328 if already activated. The first pump module 360 runs the first pump 313 at a first predetermined maximum permitted speed. The first condenser module 364 adjusts the speed of the first condenser fan 334 based on the requested CFC %. The second compressor module 370 runs the first compressor 326 at a first predetermined minimum speed.

At 712, one or more of the modules 360, 364, 368, 370 determines whether the requested CFC % is greater than or equal to a third predetermined CFC % (e.g., C %). If this is true operation 716 is performed, otherwise operation 714 is performed.

At 714, the modules 360, 364 and 370 activate the first pump 313, the first condenser fan 334 and the first compressor 326 if not already activated. The second compressor module 370 deactivates the second compressor 328 if already activated. The first pump module 360 runs the first pump 313 at the first predetermined maximum permitted speed. The first condenser module 364 runs the first condenser fan 334 at a second predetermined maximum permitted speed. The second compressor module 370 adjusts the speed of the first compressor 326 based on the requested CFC %.

At 716, one or more of the modules 360, 364, 368, 370 determines whether the requested CFC % is greater than or equal to a fourth predetermined CFC % (e.g., D %). If this is true operation 722 is performed, otherwise operation 724 is performed.

At 718, the second compressor module 370 may determine whether the second compressor 328 of the second cooling circuit 308 is activated. If this is true, operation 720 is performed, otherwise operation 714 is performed.

At 720, the first pump module 360 runs the first pump 313 at the first predetermined maximum permitted speed. The first condenser fan module 364 runs the first condenser fan 334 at the second predetermined maximum permitted speed. The second compressor module 370 runs the first compressor 326 at a second predetermined minimum speed.

At 722, one or more of the modules 360, 364, 368, 370 determines whether the requested CFC % is greater than or equal to a fifth predetermined CFC % (e.g., E %). If this is true operation 712 is performed, otherwise operation 714 is performed.

At 724, the second compressor module 370 may determine whether the second compressor 328 of the second cooling circuit 308 is activated. If this is true, operation 726 is performed, otherwise operation 728 is performed. At 726, the first pump module 360 runs the first pump 313 at the first predetermined maximum permitted speed. The first condenser fan module 364 runs the first condenser fan 334 at the second predetermined maximum permitted speed. The second compressor module 370 adjusts the speed of the first compressor 326 based on the requested CFC %.

At 728, the modules 360, 364 and 370 activate the first pump 313, the first condenser fan 334 and the first compressor 326 if not already activated. The first pump module 360 runs the first pump 313 at the first predetermined maximum permitted speed. The first condenser module 364 runs the first condenser fan 334 at the second predetermined maximum permitted speed. The second compressor module 370 runs the first compressor 326 a third predetermined maximum permitted speed.

At 730, one or more of the modules 360, 364, 368, 370 determines whether the requested CFC % is equal to a permitted maximum CFC % (e.g., MAX %). If this is true operation 734 is performed, otherwise operation 732 is performed.

At 732, the modules 360, 364 and 370 activate the first pump 313, the first condenser fan 334 and the first compressor 326 if not already activated. The first pump module 360 runs the first pump 313 at the first predetermined maximum permitted speed. The first condenser module 364 runs the first condenser fan 334 at the second predetermined maximum permitted speed. The second compressor module 370 adjusts the speed of the first compressor 326 based on the requested CFC %.

At 734, the modules 360, 364 and 370 activate the first pump 313, the first condenser fan 334 and the first compressor 326 if not already activated. The first pump module 360 runs the first pump 313 at the first predetermined maximum permitted speed. The first condenser module 364 runs the first condenser fan 334 at the second predetermined maximum permitted speed. The second compressor module 370 runs the first compressor 326 a third predetermined maximum permitted speed, which may correspond to a predetermined maximum permitted CFC % (e.g., MAX %).

Operation 702 may be performed subsequent to operations 706, 710, 714, 720, 726, 728, 732, and 734.

The above-described operations of FIGS. 7, 9, 11 and 13 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

FIG. 15 shows an example condenser fan speed versus cooling fluid temperature plot illustrating maximum permitted condenser fan speeds based on a temperature of a cooling fluid Tc. The maximum speed module 358 of FIG. 6 may determine the maximum permitted condenser fan speeds and indicated these speeds via an output signal CONDMAX. In the example shown, two maximum permitted condenser fan speeds Speed1 and Speed2 are shown. The first condenser fan speed Speed1 is determined and set based on a first temperature Temp1. The second condenser fan speed Speed 2 is determined and set based on a second temperature Temp2. Although two speeds are identified, any number of maximum permitted condenser fan speeds may be set based on the cooling fluid temperature. The maximum permitted condenser fan speed may be directly related to the cooling fluid temperature, such that as the cooling fluid temperature increases, the maximum permitted condenser fan speed increases.

In one embodiment, the maximum permitted condenser fan speed is incremented by a predetermined amount (or percentage) when the cooling fluid temperature is greater than or equal to the second speed Speed2 for longer than a predetermined period of time. The maximum permitted condenser fan speed is decremented by a predetermined amount (or percentage) when the cooling fluid temperature is less than the first speed Speed1 for longer than a predetermined period of time. The maximum permitted condenser fan speed may be adjusted as stated while operating in a PRE mode or mixed mode. The maximum permitted condenser fan speed may be reset to a default speed when (i) no longer operating in the PRE or mixed mode, and/or (ii) operating in an idle mode.

The maximum permitted condenser fan speeds described above with respect to the methods of FIGS. 7, 9, 11 and 13 may be determined as described above, based on the example plot of FIG. 15, and/or based on other similar plots and/or similar techniques for determining maximum permitted condenser fan speeds.

The above-described systems and methods, while operating in PRE and mixed modes, conserve power over traditional cooling systems by running condenser fans at less than 100% during a PRE mode or mixed mode. Although pump(s) are operated at high or full ON speeds, the corresponding energy consumption is low compared to energy consumed by operating a condenser fan or a compressor at high or full ON speeds. While in PRE and mixed modes, condenser fan and compressor speeds are adjusted based on requested CFC %s and not adjusted to provide a fixed cooling liquid temperature. The stated systems and methods provide stable cooling fluid mass flow and prevent fluid lines from freezing by operating pump(s) at high or full ON speeds during the PRE and mixed modes.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements, pumps, condenser fans, compressors, circuits, components and/or modules, these items should not be limited by these terms. These terms may be only used to distinguish one item from another item. Terms such as "first," "second," and other numerical terms when used herein do not imply a sequence or order unless clearly indicated by the context. Thus, a first item discussed herein could be termed a second item without departing from the teachings of the example implementations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cooling system comprising:
a first pump module configured to control a first pump to pump a first cooling fluid through a first cooling circuit;
a first condenser fan module configured to control a first condenser fan to transfer air across a first condenser of the first cooling circuit; and
at least one control module configured to, while operating in a pumped refrigerant economizer mode or a mixed mode, determine a requested call for cooling percentage,
wherein
the first pump module is configured to activate the first pump if the requested call for cooling percentage is greater than or equal to a first call for cooling percentage, and
the first condenser fan module is configured to (i) if the requested call for cooling percentage is greater than or equal to the first call for cooling percentage, at least one of activate the first condenser fan or operate the first condenser fan at least at a first minimum speed, and (ii) based on the requested call for cooling percentage, adjust a speed of the first condenser fan between the first minimum speed and a first maximum permitted speed to provide the requested call for cooling percentage.

2. The cooling system of claim 1, wherein:
the first cooling circuit comprises one or more compressors; and
the control module is configured to maintain the one or more compressors in an OFF state while adjusting the speed of the first condenser fan based on the requested call for cooling percentage.

3. The cooling system of claim 1, wherein:
the first condenser fan module is configured to maintain the speed of the first condenser fan at the first minimum speed while the requested call for cooling percentage is between the first call for cooling percentage and a second call for cooling percentage; and
the first call for cooling percentage is greater than the second call for cooling percentage.

4. The cooling system of claim 1, wherein:
the first condenser fan module is configured to deactivate the first condenser fan if the requested call for cooling percentage is less than a second call for cooling percentage;
the first pump module is configured to deactivate the first pump if the requested call for cooling percentage is less than a third call for cooling percentage;
the second call for cooling percentage is less than the first call for cooling percentage; and
the third call for cooling percentage is less than the second call for cooling percentage.

5. The cooling system of claim 1, further comprising:
a second pump module configured to control a second pump to circulate a second coolant through a second cooling circuit; and
a second condenser fan module configured to control a second condenser fan to transfer air across a second condenser of the second cooling circuit,
wherein
the second pump module is configured to activate the second pump if the requested call for cooling percentage is equal to a maximum call for cooling percentage, and
the second condenser fan module is configured to (i) activate the second condenser fan if the requested call for cooling percentage is equal to a maximum permitted call for cooling percentage, and (ii) based on the requested call for cooling percentage, adjust a speed of the second condenser fan between a second minimum speed and a second maximum permitted speed to provide the requested call for cooling percentage.

6. The cooling system of claim 5, wherein the first condenser fan module is configured to, if the requested call for cooling percentage is greater than or equal to a second call for cooling percentage, (i) operate the first condenser fan at the first maximum permitted speed while the second condenser fan is deactivated, and (ii) operate the first condenser fan at a same speed as the second condenser fan while the second condenser fan is activated.

7. The cooling system of claim 6, wherein:
the second condenser fan module is configured to, subsequent to activating the second condenser fan, maintain the speed of the second condenser fan at the speed of the first condenser fan while the requested call for cooling percentage is greater than or equal to a third call for cooling percentage; and
the third call for cooling percentage is greater than the first call for cooling percentage and less than the second call for cooling percentage.

8. The cooling system of claim 7, wherein, while the requested call for cooling percentage is greater than or equal to the second call for cooling percentage and less than or equal to the maximum permitted call for cooling percentage:
the first condenser fan module is configured to adjust the speed of the first condenser fan based on the requested call for cooling percentage; and
the second condenser fan module is configured to adjust the speed of the second condenser fan based on the requested call for cooling percentage.

9. The cooling system of claim 6, wherein, if the requested call for cooling percentage is less than or equal to a third call for cooling percentage:
the second pump module is configured to deactivate the second pump;
the second condenser fan module is configured to deactivate the second condenser fan; and
the first condenser fan module is configured to increase the speed of the first condenser fan,
wherein the third call for cooling percentage is less than the second call for cooling percentage and greater than the first call for cooling percentage.

10. The cooling system of claim 5, wherein:
the first condenser fan module is configured to deactivate the first condenser fan if the requested call for cooling percentage is less than a second call for cooling percentage;
the first pump module is configured to deactivate the first pump if the requested call for cooling percentage is less than a third call for cooling percentage;
the second call for cooling percentage is less than the first call for cooling percentage; and
the third call for cooling percentage is less than the second call for cooling percentage.

11. The cooling system of claim 1, further comprising a compressor module configured to (i) control a first compressor to compress a second cooling fluid in a second cooling circuit, and (ii) if the requested call for cooling percentage is greater than or equal to the first call for cooling percentage, at least one of activate the first compressor or operate the first compressor at a first speed.

12. The cooling system of claim 11, wherein:
the compressor module is configured to (i) maintain the first compressor at a minimum speed while the requested call for cooling percentage is between the first call for cooling percentage and a second call for cooling percentage, and (ii) adjust the first speed of the first compressor to a second speed based on the requested call for cooling percentage while the requested call for cooling percentage is greater than or equal to the second call for cooling percentage;
the minimum speed of the first compressor is greater than 0; and
the second call for cooling percentage is greater than the first call for cooling percentage.

13. The cooling system of claim 12, wherein the first condenser fan module is configured to (i) maintain the speed of the first condenser fan at the first maximum permitted speed while the requested call for cooling percentage is greater than or equal to the second call for cooling percentage, and (ii) adjust the speed of the first condenser fan based on the requested call for cooling percentage while the requested call for cooling percentage is between the first call for cooling percentage and the second call for cooling percentage.

14. The cooling system of claim 11, wherein:
the compressor module is configured to (i) control a second compressor to compress the second cooling fluid in the second cooling circuit, and (ii) activate the second compressor if the requested call for cooling percentage is greater than or equal to a second call for cooling percentage; and
the second call for cooling percentage is greater than the first call for cooling percentage.

15. The cooling system of claim 14, wherein the compressor module is configured to decrease the first speed of the first compressor to a second speed if the requested call for cooling percentage is greater than or equal to the second call for cooling percentage.

16. The cooling system of claim 14, wherein, while the requested call for cooling percentage is greater than or equal to the second call for cooling percentage, the compressor module is configured to (i) adjust the first speed of the first compressor to a second speed based on the requested call for cooling percentage, and (ii) operate the second compressor at a fixed speed based on the requested call for cooling percentage.

17. The cooling system of claim 14, wherein:
the compressor module is configured to deactivate the second compressor if the requested call for cooling percentage is less than or equal to a third call for cooling percentage; and
the third call for cooling percentage is less than the second call for cooling percentage and greater than the first call for cooling percentage.

18. The cooling system of claim 17, wherein the compressor module is configured to increase the first speed of the first compressor to a second speed the requested call for cooling percentage decreases to less than or equal to the third call for cooling percentage.

19. The cooling system of claim 17, wherein:
the compressor module is configured to (i) adjust the first speed of the first compressor to a second speed based on the requested call for cooling percentage if the requested call for cooling percentage is between the third call for cooling percentage and a fourth call for cooling percentage, and (ii) maintain the first compressor at the first speed if the requested call for cooling percentage is between the first call for cooling percentage and the fourth call for cooling percentage; and
the fourth call for cooling percentage is less than the third call for cooling percentage and greater than the first call for cooling percentage.

20. The cooling system of claim 14, wherein:
the compressor module is configured to (i) operate the first compressor at a second maximum permitted speed while the second compressor is deactivated and the requested call for cooling percentage is between a third call for cooling percentage and the second call for cooling percentage, and (ii) subsequent to the second compressor being activated and independent of whether the second compressor is activated, (a) adjust the first speed of the first compressor to a second speed based on the requested call for cooling percentage while the requested call for cooling is greater than the third call for cooling percentage, and (b) maintaining the first compressor at a second minimum speed while the requested call for cooling percentage is between the third call for cooling percentage and a fourth call for cooling percentage;
the third call for cooling percentage is less than the second call for cooling percentage and greater than the fourth call for cooling percentage; and
the fourth call for cooling percentage is greater than the first call for cooling percentage.

21. A method of controlling a cooling system, the method comprising:
controlling a first pump to pump a first cooling fluid through a first cooling circuit;
controlling a first condenser fan to transfer air across a first condenser of the first cooling circuit;
while operating in a pumped refrigerant economizer mode or a mixed mode, determining a requested call for cooling percentage;
activating the first pump if the requested call for cooling percentage is greater than or equal to a first call for cooling percentage;
if the requested call for cooling percentage is greater than or equal to the first call for cooling percentage, at least one of activating the first condenser fan or operating the first condenser fan at least at a first minimum speed; and
based on the requested call for cooling percentage, adjusting a speed of the first condenser fan between the first minimum speed and a first maximum permitted speed to provide the requested call for cooling percentage.

22. The method of claim 21, further comprising maintaining one or more compressors in an OFF state while adjusting the speed of the first condenser fan based on the requested call for cooling percentage, wherein the first cooling circuit comprises the one or more compressors.

23. The method of claim 21, further comprising maintaining the speed of the first condenser fan at the first minimum speed while the requested call for cooling percentage is between the first call for cooling percentage and a second call for cooling percentage, wherein the first call for cooling percentage is greater than the second call for cooling percentage.

24. The method of claim 21, further comprising:
deactivating the first condenser fan if the requested call for cooling percentage is less than a second call for cooling percentage; and
deactivating the first pump if the requested call for cooling percentage is less than a third call for cooling percentage,
wherein
the second call for cooling percentage is less than the first call for cooling percentage, and
the third call for cooling percentage is less than the second call for cooling percentage.

25. The method of claim 21, further comprising:
controlling a second pump to circulate a second coolant through a second cooling circuit;
controlling a second condenser fan to transfer air across a second condenser of the second cooling circuit;
activating the second pump if the requested call for cooling percentage is equal to a maximum call for cooling percentage;
activating the second condenser fan if the requested call for cooling percentage is equal to a maximum permitted call for cooling percentage; and
based on the requested call for cooling percentage, adjusting a speed of the second condenser fan between a second minimum speed and a second maximum permitted speed to provide the requested call for cooling percentage.

26. The method of claim 25, further comprising, if the requested call for cooling percentage is greater than or equal to a second call for cooling percentage, (i) operating the first condenser fan at the first maximum permitted speed while the second condenser fan is deactivated, and (ii) operating the first condenser fan at a same speed as the second condenser fan while the second condenser fan is activated.

27. The method of claim 26, further comprising, subsequent to activating the second condenser fan, maintaining the speed of the second condenser fan at the speed of the first condenser fan while the requested call for cooling percentage is greater than or equal to a third call for cooling percentage, wherein the third call for cooling percentage is greater than the first call for cooling percentage and less than the second call for cooling percentage.

28. The method of claim 27, further comprising, while the requested call for cooling percentage is greater than or equal to the second call for cooling percentage and less than or equal to the maximum permitted call for cooling percentage:
adjusting the speed of the first condenser fan based on the requested call for cooling percentage; and
adjusting the speed of the second condenser fan based on the requested call for cooling percentage.

29. The method of claim 26, further comprising, if the requested call for cooling percentage is less than or equal to a third call for cooling percentage:
deactivating the second pump;
deactivating the second condenser fan; and
increasing the speed of the first condenser fan,
wherein the third call for cooling percentage is less than the second call for cooling percentage and greater than the first call for cooling percentage.

30. The method of claim 25, further comprising:
deactivating the first condenser fan if the requested call for cooling percentage is less than a second call for cooling percentage; and
deactivating the first pump if the requested call for cooling percentage is less than a third call for cooling percentage,
wherein
the second call for cooling percentage is less than the first call for cooling percentage, and
the third call for cooling percentage is less than the second call for cooling percentage.

31. The method of claim 21, further comprising:
controlling a first compressor to compress a second cooling fluid in a second cooling circuit; and
if the requested call for cooling percentage is greater than or equal to the first call for cooling percentage, at least one of activating the first compressor or operating the first compressor at first speed.

32. The method of claim 31, further comprising:
maintaining the first compressor at a minimum speed while the requested call for cooling percentage is between the first call for cooling percentage and a second call for cooling percentage; and
adjusting the of the first compressor to a second speed based on the requested call for cooling percentage while the requested call for cooling percentage is greater than or equal to the second call for cooling percentage,
wherein the minimum speed of the first compressor is greater than 0.

33. The method of claim 32, further comprising:
maintaining the speed of the first condenser fan at the first maximum permitted speed while the requested call for cooling percentage is greater than or equal to the second call for cooling percentage; and
adjusting the speed of the first condenser fan based on the requested call for cooling percentage while the requested call for cooling percentage is between the first call for cooling percentage and the second call for cooling percentage.

34. The method of claim 31, further comprising:
controlling a second compressor to compress the second cooling fluid in the second cooling circuit; and
activating the second compressor if the requested call for cooling percentage is greater than or equal to a second call for cooling percentage.

35. The method of claim 34, further comprising decreasing the speed of the first compressor a second speed if the requested call for cooling percentage is greater than or equal to the second call for cooling percentage.

36. The method of claim 34, further comprising, while the requested call for cooling percentage is greater than or equal to the second call for cooling percentage, (i) adjusting the first speed of the first compressor to a second speed based on the requested call for cooling percentage, and (ii) operating the second compressor at a fixed speed based on the requested call for cooling percentage.

37. The method of claim 34, further comprising deactivating the second compressor if the requested call for cooling percentage is less than or equal to a third call for cooling percentage, wherein the third call for cooling percentage is less than the second call for cooling percentage and greater than the first call for cooling percentage.

38. The method of claim 37, further comprising increasing the speed of the first compressor to a second speed if the requested call for cooling percentage decreases to less than or equal to the third call for cooling percentage.

39. The method of claim 37, further comprising:
adjusting the first speed of the first compressor to a second speed based on the requested call for cooling percentage if the requested call for cooling percentage is between the third call for cooling percentage and a fourth call for cooling percentage; and maintaining the first compressor at the first speed if the requested call for cooling percentage is between the first call for cooling percentage and the fourth call for cooling percentage, wherein the fourth call for cooling percentage is less than the third call for cooling percentage and greater than the first call for cooling percentage.

40. The method of claim 34, further comprising:

operating the first compressor at a second maximum permitted speed while the second compressor is deactivated and the requested call for cooling percentage is between a third call for cooling percentage and the second call for cooling percentage; and subsequent to the second compressor being activated and independent of whether the second compressor is activated, (a) adjusting the first speed of the first compressor to a second speed based on the requested call for cooling percentage while the requested call for cooling is greater than the third call for cooling percentage, and (b) maintaining the first compressor at second minimum speed while the requested call for cooling percentage is between the third call for cooling percentage and a fourth call for cooling percentage, wherein
the third call for cooling percentage is less than the second call for cooling percentage and greater than the fourth call for cooling percentage, and
the fourth call for cooling percentage is greater than the first call for cooling percentage.

\* \* \* \* \*